Figure 1:
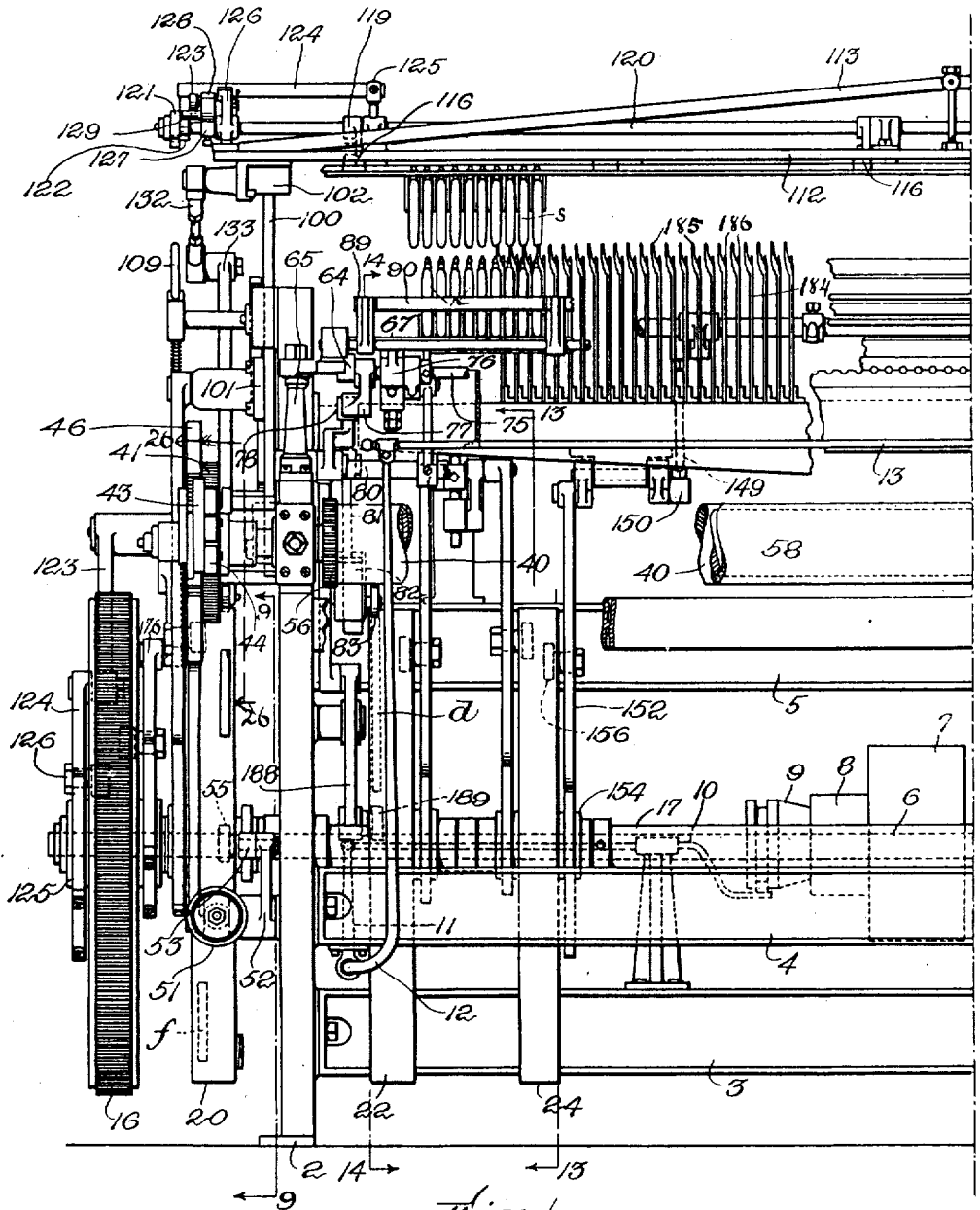

D. H. SAUNDERS.
NET MACHINE.
APPLICATION FILED JULY 19, 1909. RENEWED MAR. 12, 1914.

1,110,718.

Patented Sept. 15, 1914.
16 SHEETS—SHEET 1.

Witnesses:
H. C. Witt
M. M. Harrington

Inventor:
David H. Saunders
By Henry J. Miller
atty.

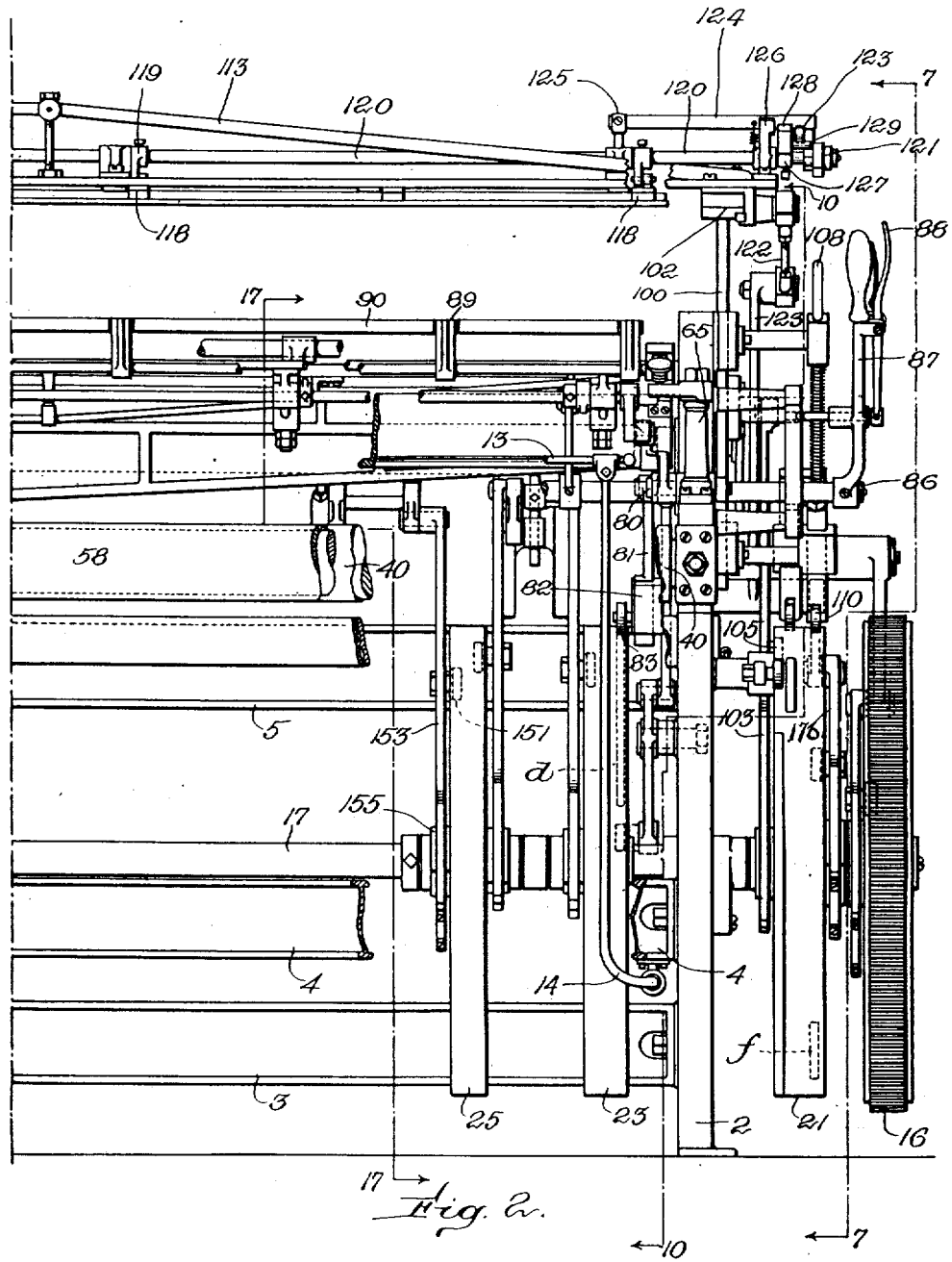

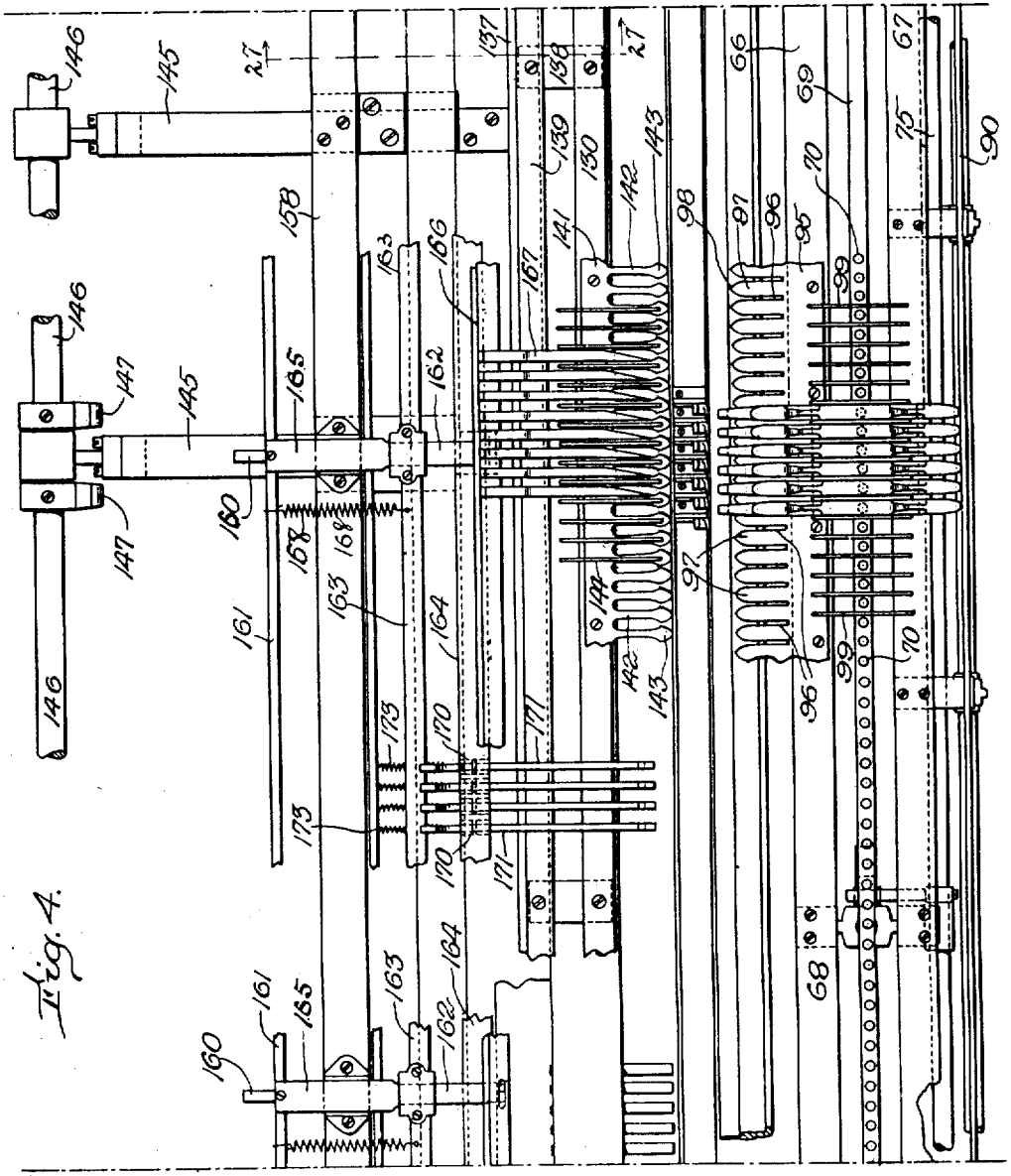

D. H. SAUNDERS.
NET MACHINE.
APPLICATION FILED JULY 19, 1909. RENEWED MAR. 12, 1914.

1,110,718.

Patented Sept. 15, 1914.
16 SHEETS—SHEET 7.

Witnesses:
H.C.Witt
M. M. Harrington

Inventor:
David H. Saunders
By Henry J. Miller atty.

D. H. SAUNDERS.
NET MACHINE.
APPLICATION FILED JULY 19, 1909. RENEWED MAR. 12, 1914.
1,110,718.
Patented Sept. 15, 1914.
16 SHEETS—SHEET 8.
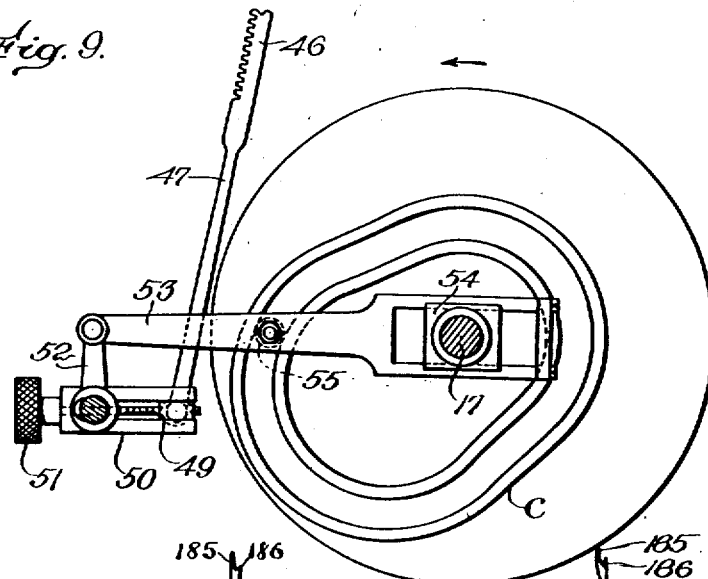
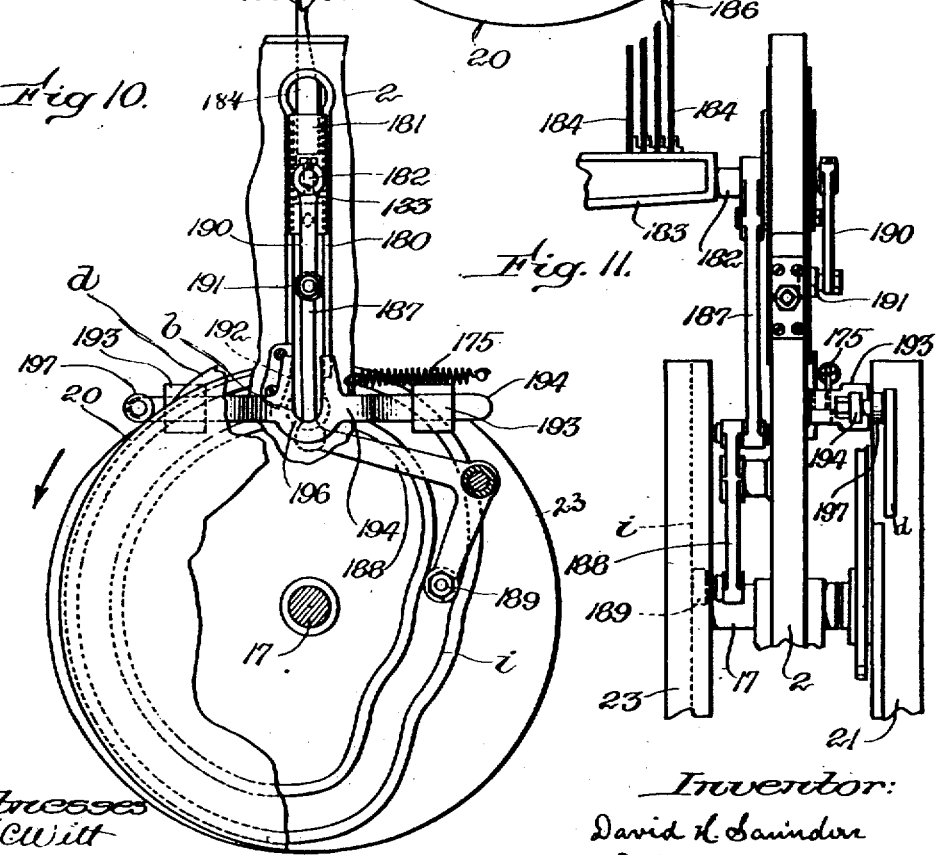
Witnesses
H. C. Witt
M. M. Harrington
Inventor:
David H. Saunders
By Henry J. Miller
atty.

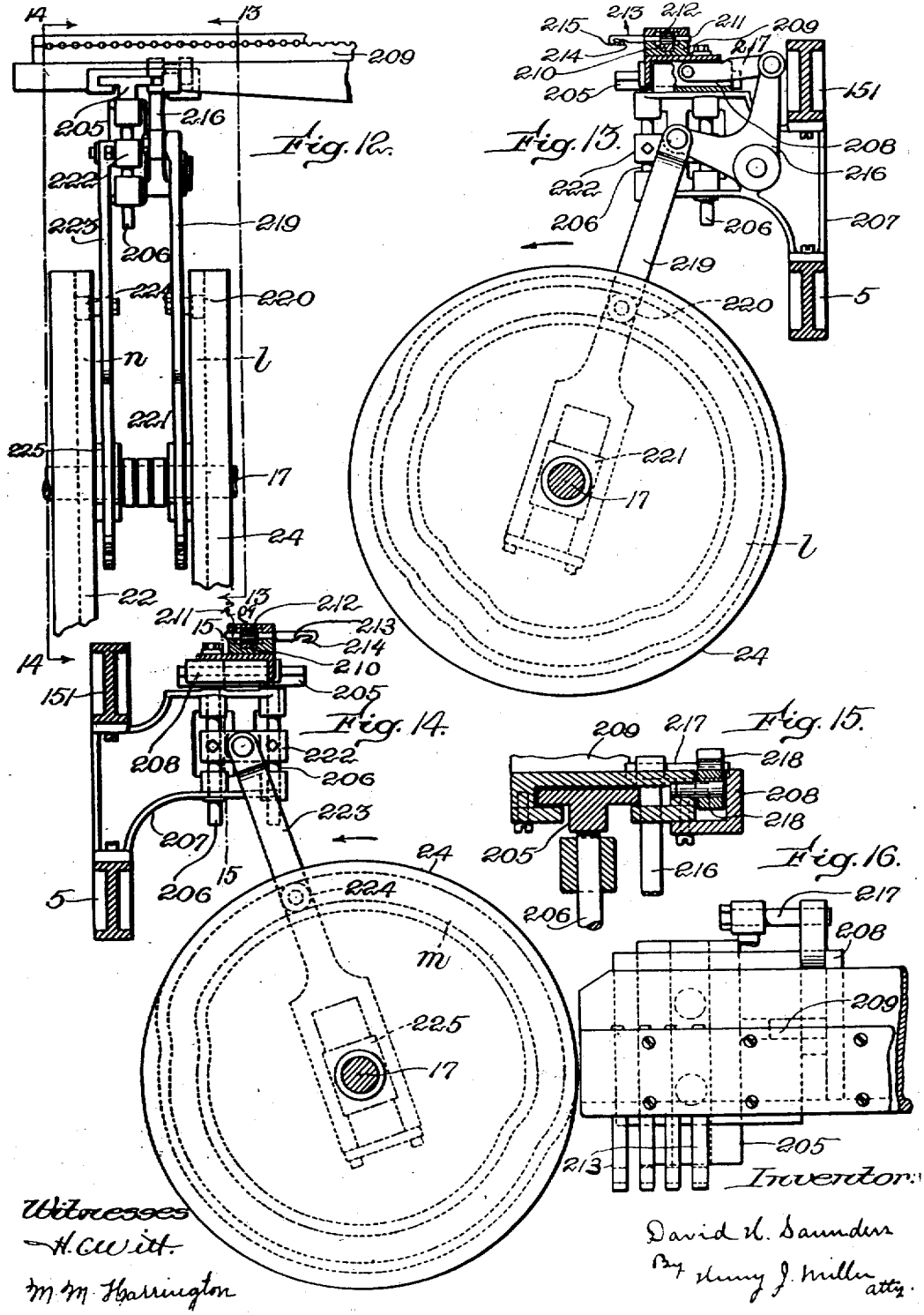

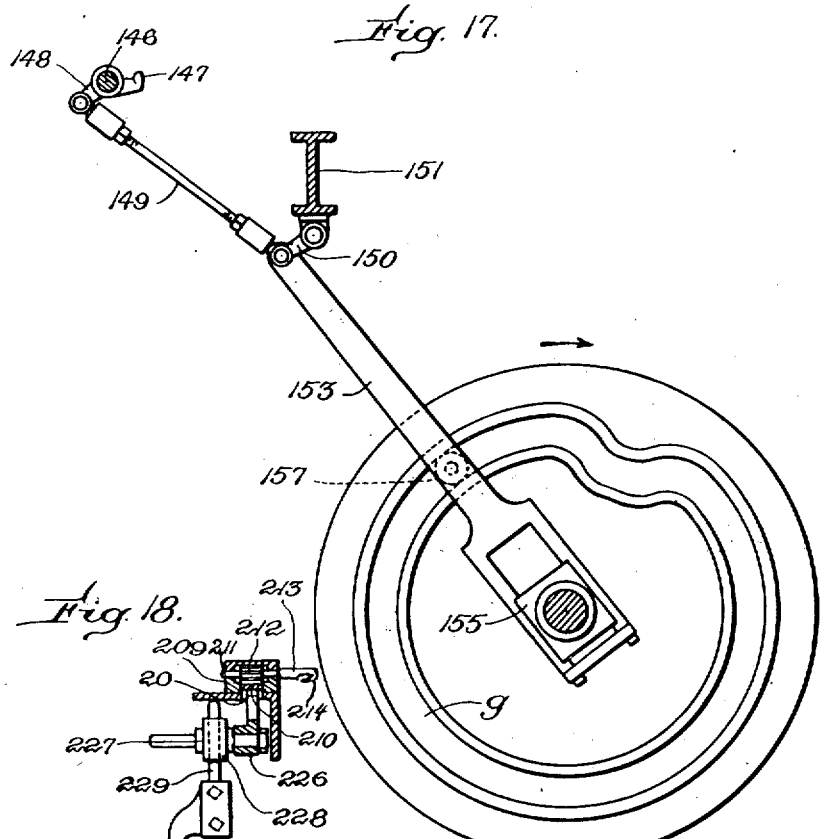

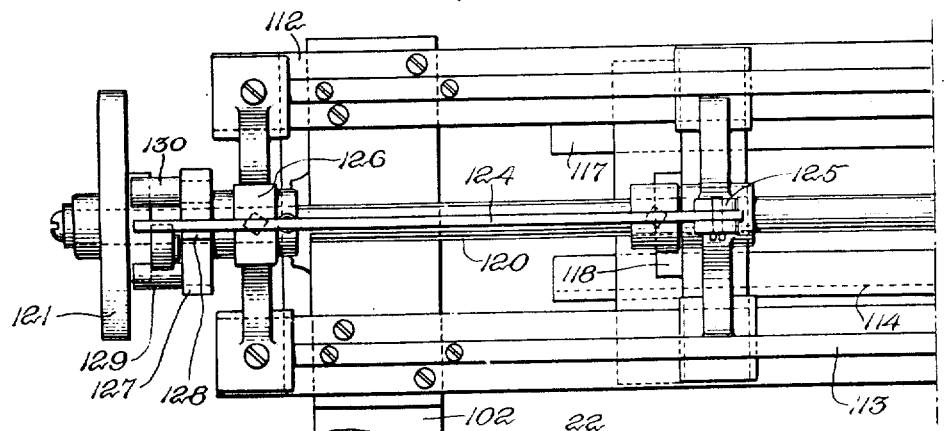
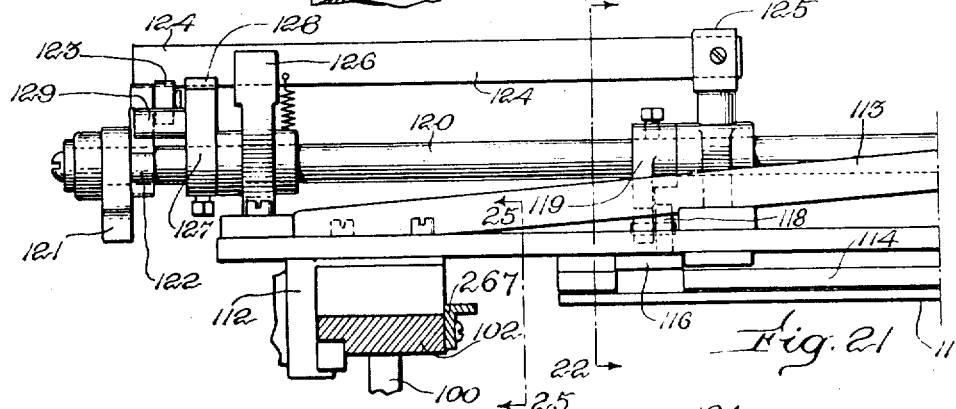
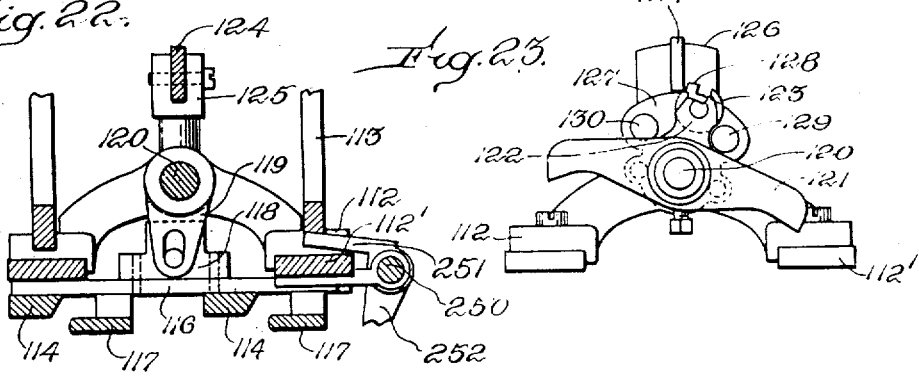

D. H. SAUNDERS.
NET MACHINE.
APPLICATION FILED JULY 19, 1909. RENEWED MAR. 12, 1914.
1,110,718.
Patented Sept. 15, 1914.
16 SHEETS—SHEET 12.
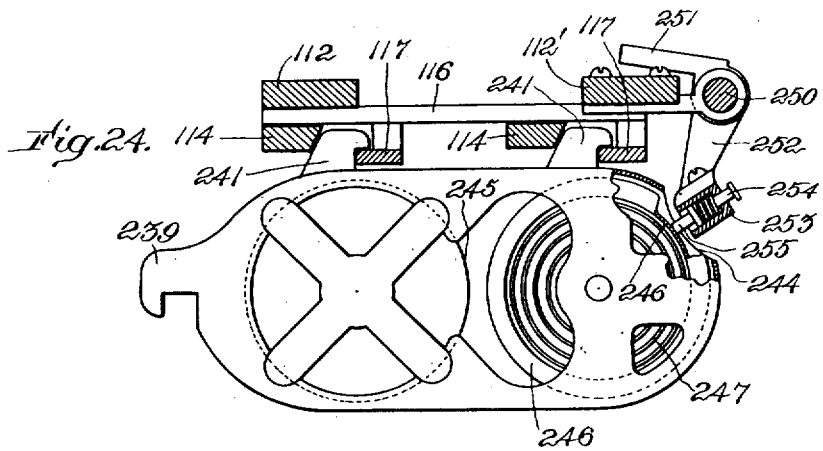
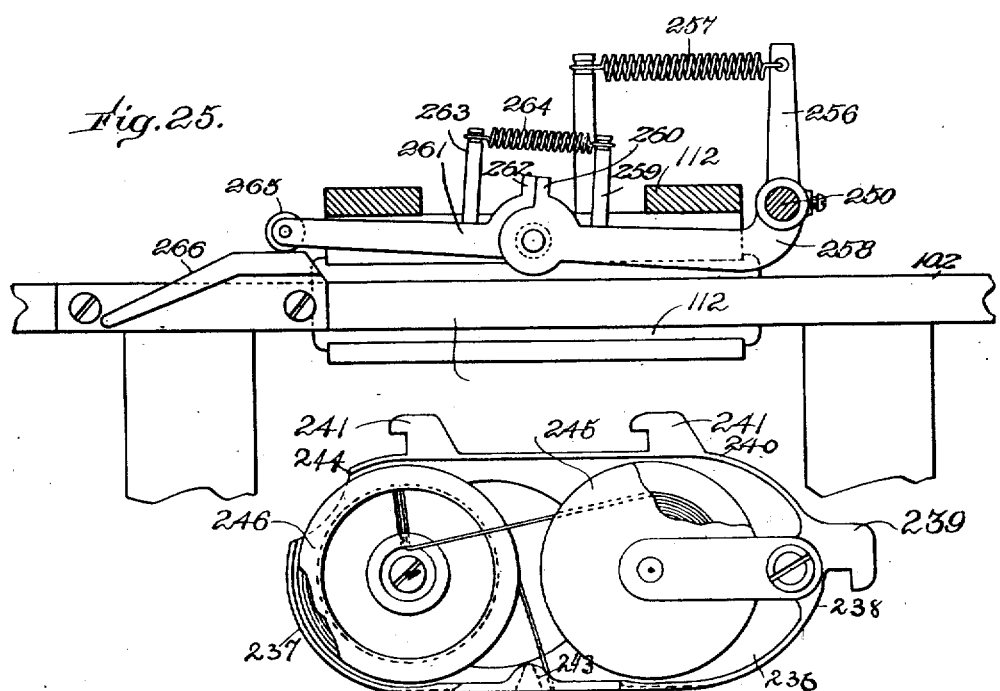

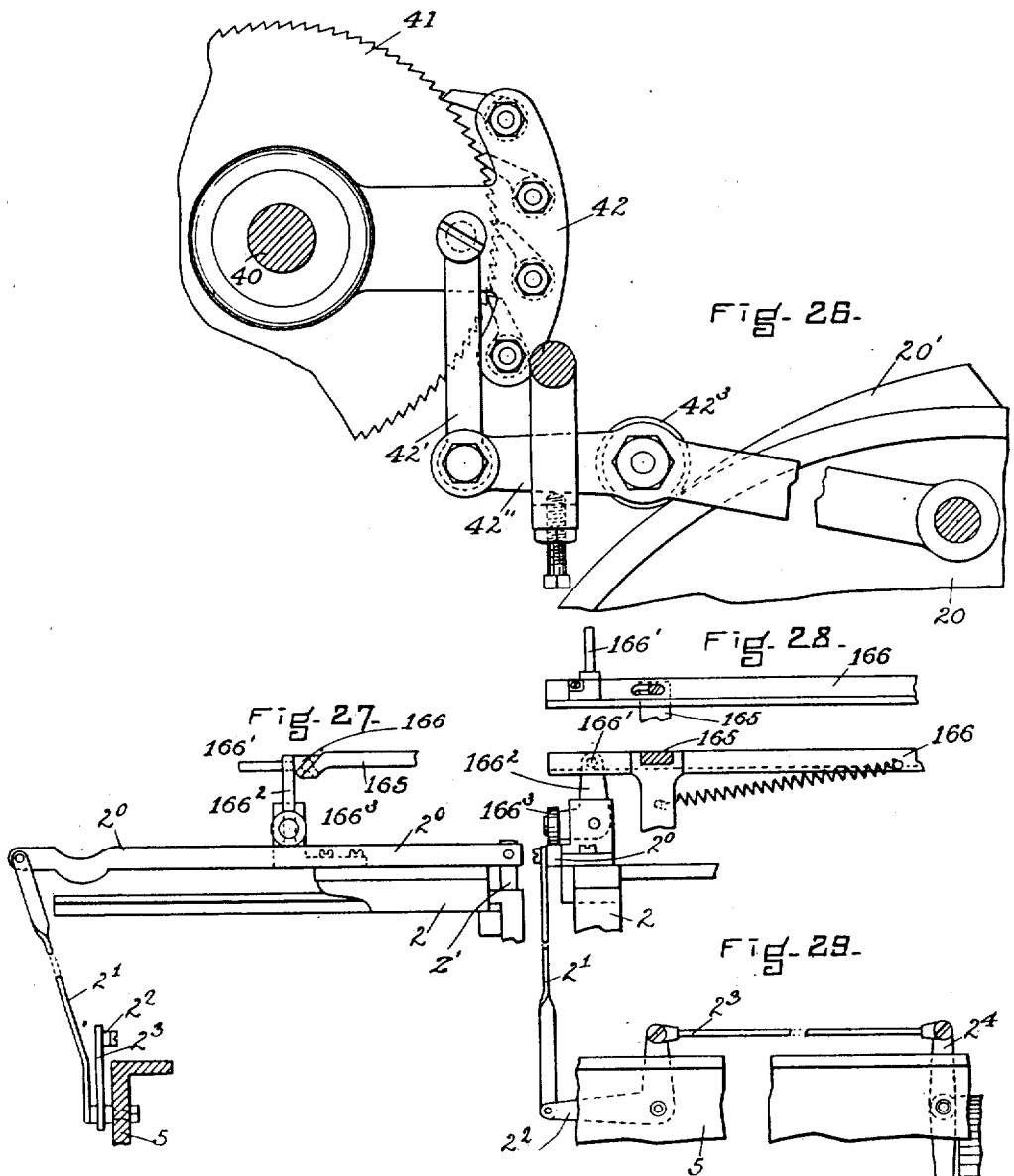

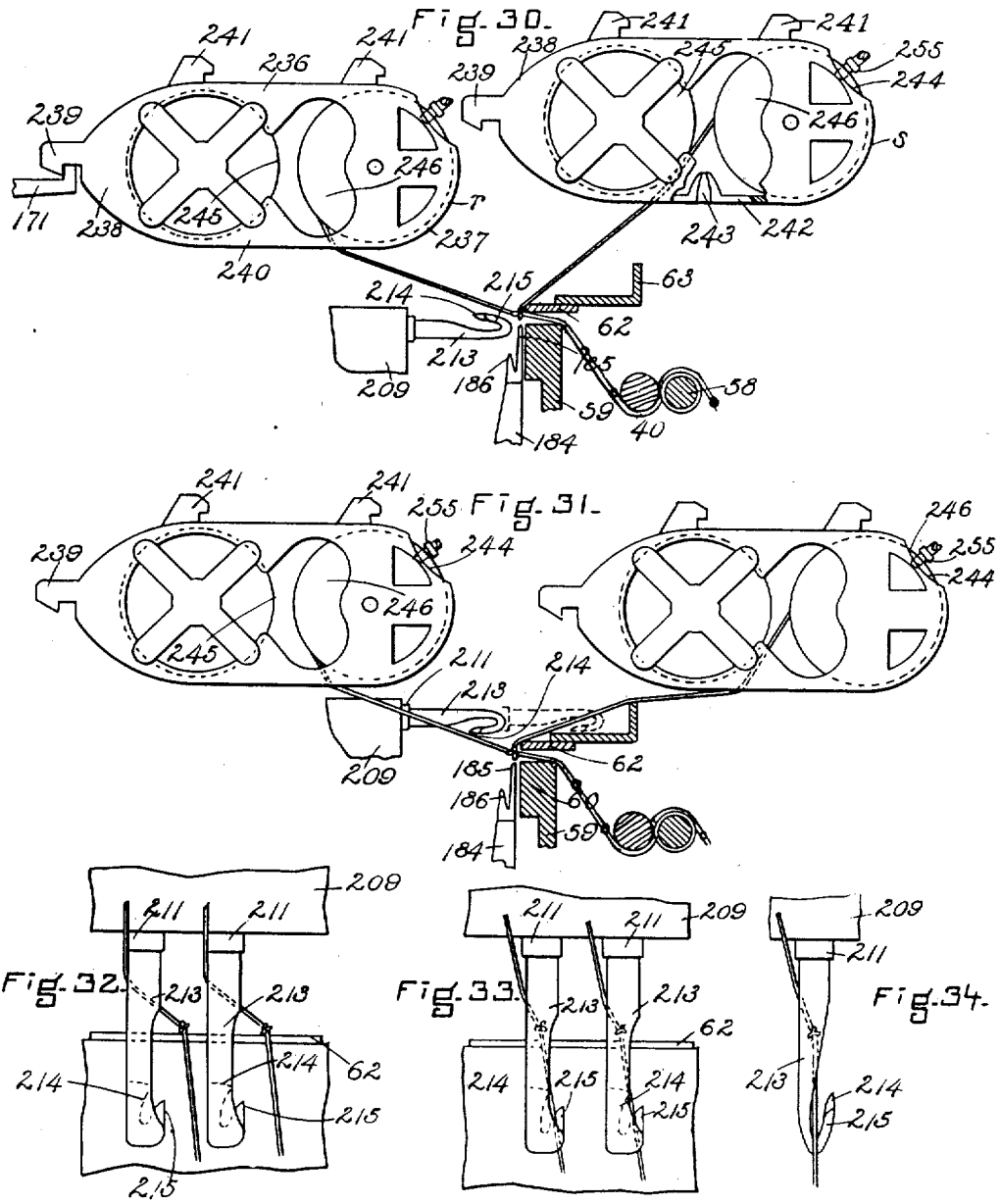

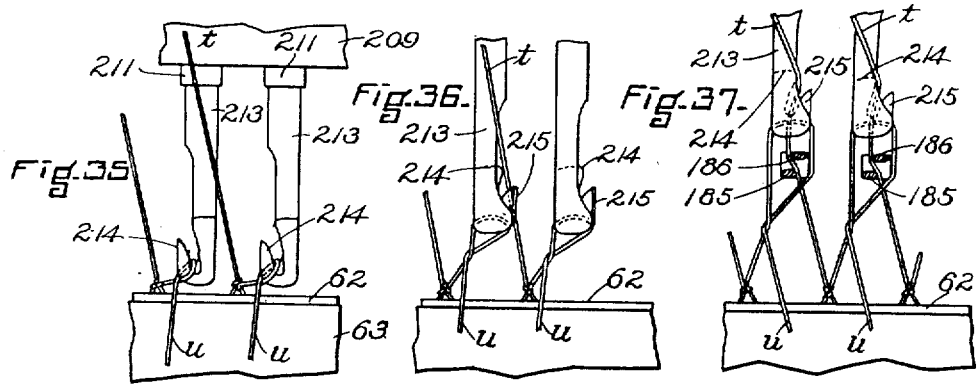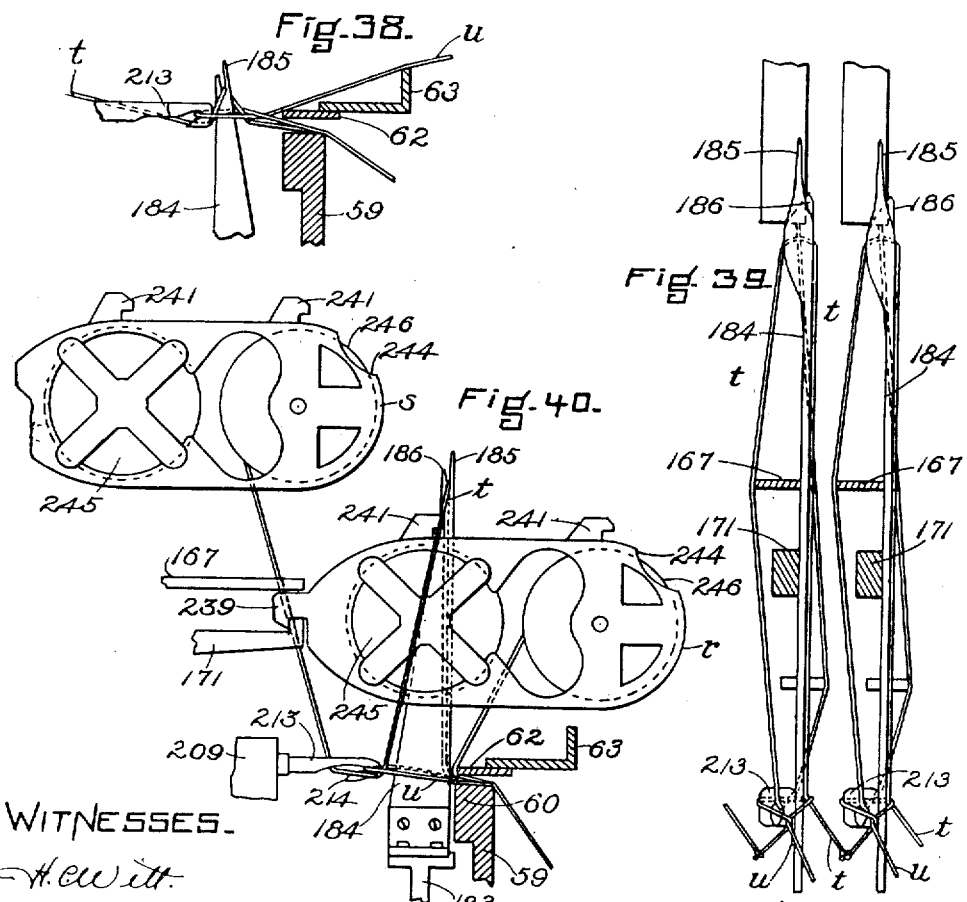

D. H. SAUNDERS.
NET MACHINE.
APPLICATION FILED JULY 19, 1909. RENEWED MAR. 12, 1914.
1,110,718.
Patented Sept. 15, 1914.
16 SHEETS—SHEET 16.
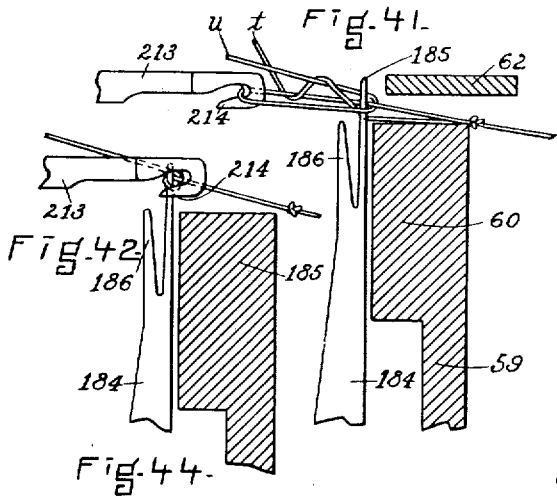
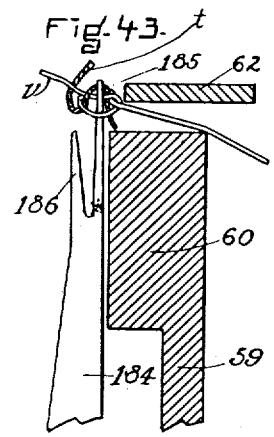
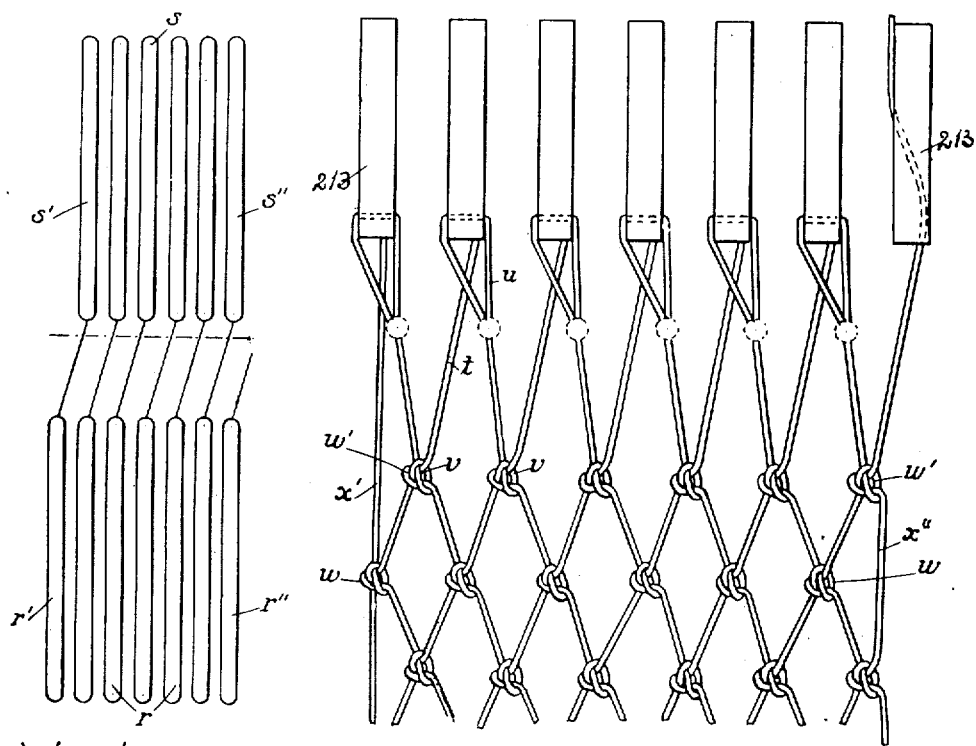
WITNESSES
H. C. Witt
M. M. Harrington
INVENTOR
David H. Saunders
By Henry J. Miller
atty.

UNITED STATES PATENT OFFICE.

DAVID HENRY SAUNDERS, OF GLOUCESTER, MASSACHUSETTS, ASSIGNOR, BY MESNE ASSIGNMENTS, TO HERBERT E. HOUNSELL, LIMITED, OF BRIDGEPORT, ENGLAND, A CORPORATION OF GREAT BRITAIN.

NET-MACHINE.

1,110,718.   Specification of Letters Patent.   Patented Sept. 15, 1914.

Application filed July 19, 1909, Serial No. 508,273.   Renewed March 12, 1914.   Serial No. 824,317.

*To all whom it may concern:*

Be it known that I, DAVID H. SAUNDERS, of Gloucester, in the county of Essex and State of Massachusetts, have invented an Improvement in Net-Machines; and I hereby declare that the following is a full, clear, and exact specification of the same, reference being had to the accompanying drawings, forming part thereof.
This invention relates to improvements in machines for making nets.

One object of this invention is to so construct a net making machine that all the net forming strands may be carried by independent shuttles arranged in series which series have relative movement to effect the tying of knots in related strands by the aid of mechanism operating at points intermediate the limits of movement of the shuttles.
Another object is to improve the mechanism for effecting the relative movement of the series of shuttles.

Another object of the invention is to improve the means for drawing out certain of the shuttle threads and forming loops therein.

Another object of the invention is to provide improved means for forming sheds, so called, in certain of the shuttle threads and passing said sheds through loops in threads extending from shuttles, which shuttles are passed through said sheds.

Another object of the invention is to improve the construction of net making machines generally whereby the operation of two series of shuttles, of which the numbers of shuttles differ, is facilitated to effect the tying of knots in strands carried by said shuttles to produce a net in which all the knots extend in one general direction at one side of the net.

The invention consists in certain peculiar features of construction and novel combinations of said parts in distinct groups as well as in the novel combination of certain of said groups of mechanism as will hereinafter be more fully described and pointed out in the claims.

Figure 5:
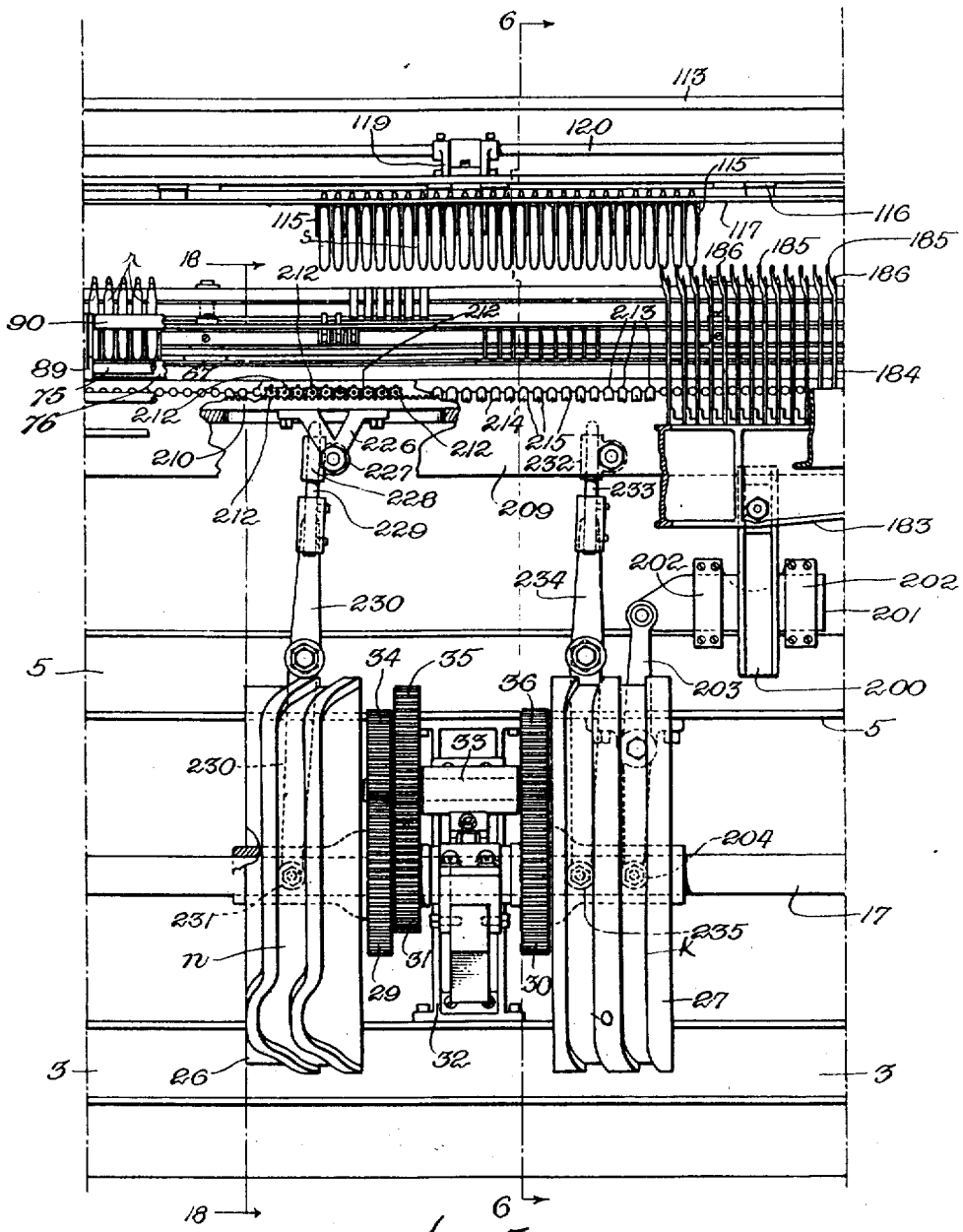
Figure 5:
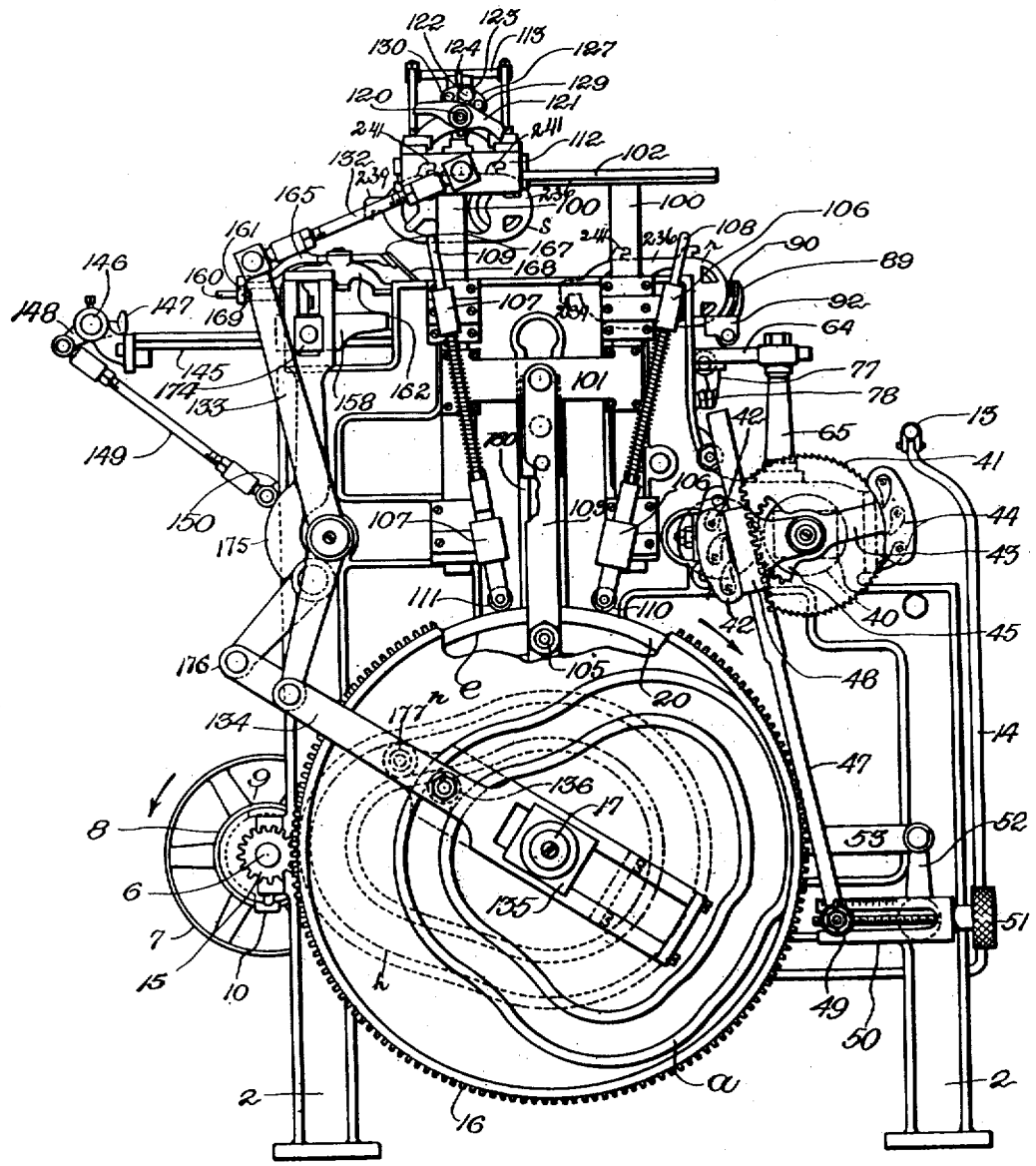
Figure 6:
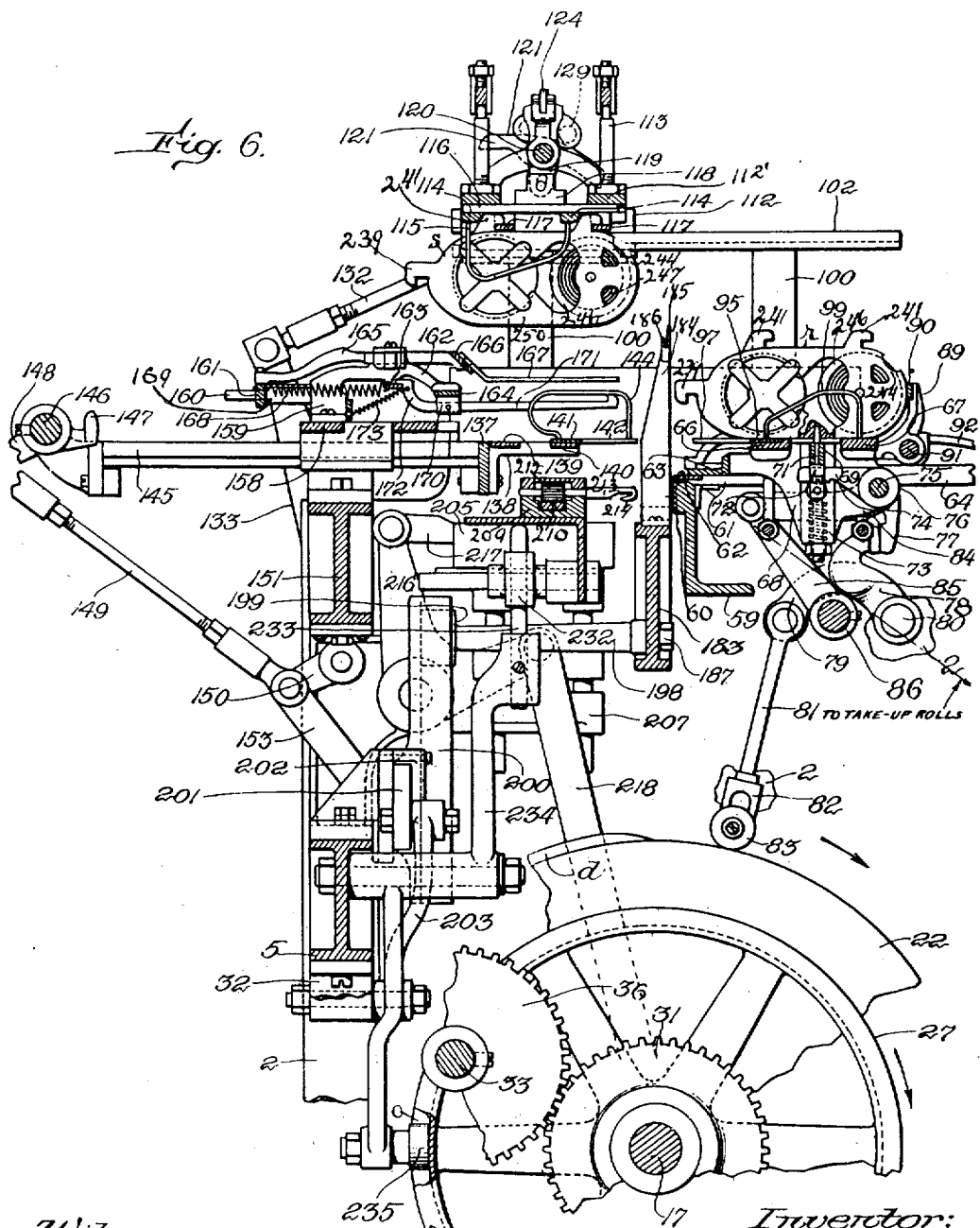
Figures 7, 8:
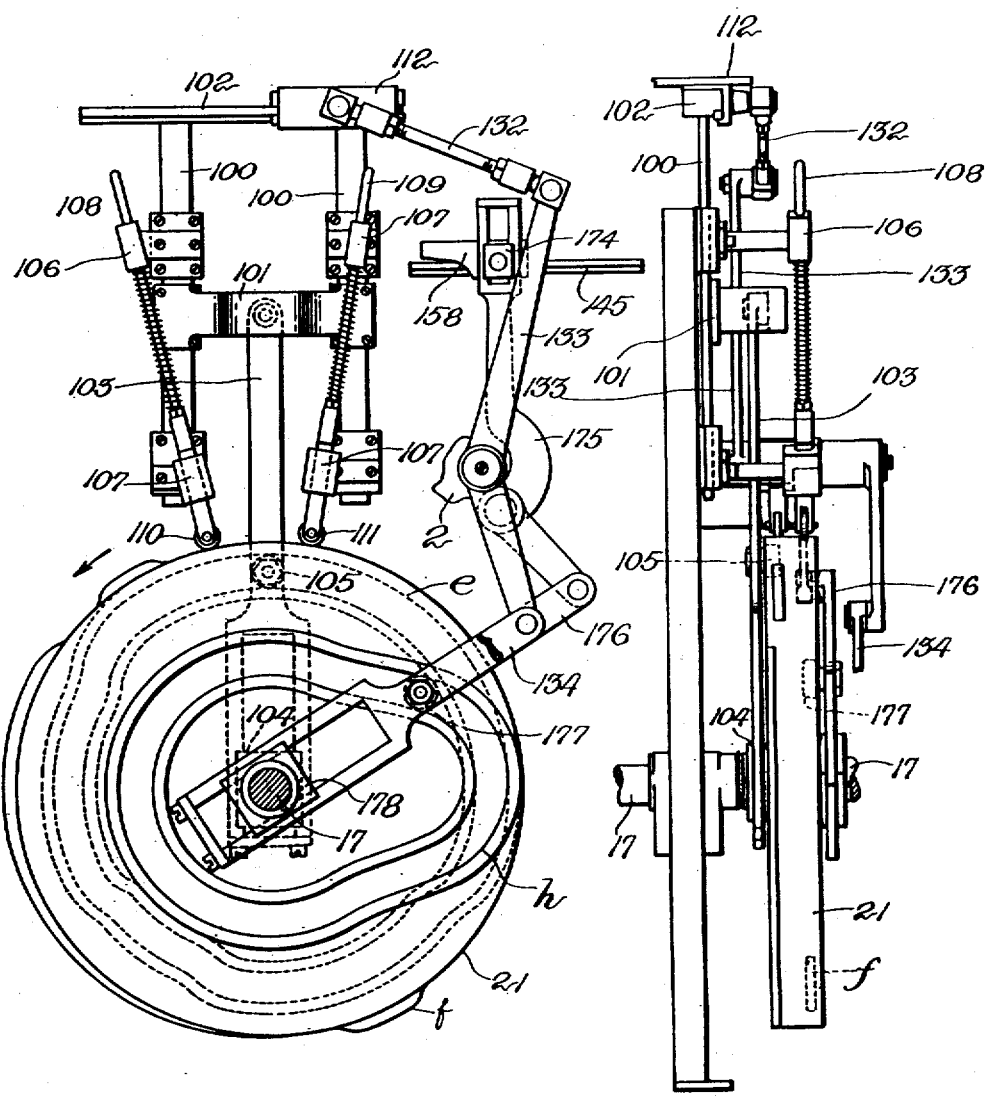

Figure 1, represents a front elevation of the left hand end of the improved net machine, parts of the same being broken away. Fig. 2, represents a similar view of the right hand end of the machine parts of which are broken away. Fig. 3, represents a similar view of the machine between the ends shown in Figs. 1 and 2, portions of the mechanism being broken away and other portions thereof being omitted. Fig. 4, represents a plan view of portions of the mechanism shown in Fig. 3. Fig. 5, represents an end view of the machine looking toward the right in Fig. 1, parts of the same being broken away. Fig. 6, represents an enlarged sectional view, taken on line 6—6 Fig. 3, looking in the direction indicated by the arrows of said section line, parts of the mechanism being broken away. Fig. 7, represents a sectional detail view taken on line 7—7 Fig. 2, looking in the direction indicated by the section line arrows, parts of the mechanism being omitted. Fig. 8, represents a front elevation of the parts shown in Fig. 7, shown in relation to the nearest end frame. Fig. 9, represents a cross sectional detail view of parts of the take up means taken on line 9—9 Fig. 1 looking in the direction indicated by the section line arrows. Fig. 10, represents a similar detail view of the needle bar actuating mechanism taken on line 10—10 Fig. 2 looking in the direction indicated by the section line arrows, some of the parts being omitted and others broken away. Fig. 11, represents a front elevation of some of the parts shown in Fig. 10 with parts related thereto. Fig. 12, represents in front elevation details of one of the finger rail advancing and retracting mechanism and parts of the means whereby said rail is moved vertically. Fig. 13, represents a sectional view of said finger rail or loop drawing means and its supporting means shown in relation to its advancing and retracting mechanism, said section being taken on line 13—13 Figs. 1 and 12 looking in the directions indicated by the arrows associated with the respective section lines. Fig. 14, represents a similar view of details of one of the means for moving the finger rail vertically as taken on lines 14—14 Figs. 1 and 12 looking in the directions indicated by the respective section line arrows. Fig. 15, represents an enlarged sectional view taken on line 15—15 Fig. 14, some of the parts being omitted. Fig. 16, represents a plan view of Fig. 15. Fig. 17, represents a sectional view taken on line 17—17 Fig. 2 looking in the direction indicated by the section line arrows to show the locking mechanism for holding the loop drawing out means in the retracted position. Fig. 18, represents a sectional view taken on line 18—18 Fig. 3 looking in the direction indicated by the section line arrows to show the means for effecting the rotation of the loop drawing fingers. Fig. 19, represents details of the lock for the shuttle support shifter mechanism. Fig. 20, represents an enlarged plan view of the end portions of the machine to show the shuttle carrier and its shuttle locking means. Fig. 21, represents a front elevation of Fig. 20, one of its supporting guides being shown in section. Fig. 22, represents a sectional view taken on line 22—22 Fig. 21, looking in the direction indicated by the section line arrows. Fig. 23, represents an end view of parts of the same looking toward the right in Fig. 21. Fig. 24, represents a cross sectional view of parts of the machine, taken on lines 6—6 Fig. 3, looking in the direction indicated by the arrows, showing the construction of the shuttle used in this machine and illustrating, the construction of the shuttles and the brake mechanism mounted on the shuttle carriage. Fig. 25, represents a sectional view of parts of the machine, taken on line 25—25 Fig. 21, showing the shuttle brake operating mechanism. Fig. 25ª, represents a side elevation of one of the shuttles used in this machine, of which all are similar. Fig. 26, represents a sectional view of parts of the machine taken on line 26—26 Fig. 1, looking in the direction of the arrows, to more clearly show parts of the positive take up mechanism. Fig. 27, represents a detail view, partly in section, taken on line 27—27 Fig. 4 looking in the direction indicated by the arrows to show the means for moving the separator blades laterally. Fig. 28, represents a detail plan view of parts shown in Fig. 27, to illustrate the slidable support for the separator blades. Fig. 29, represents a detail view of some of the parts shown in Fig. 27, taken from the back of the machine, and, in addition, illustrating the operating connections and the cam, for actuating the same, mounted on cam member 20. Fig. 30, represents a sectional view of parts of the machine taken on line 6—6 Fig. 3, looking in the direction indicated by the arrows thereof to illustrate another position of the shuttles relative to the looper hooks and the needles to be hereafter more fully described. Fig. 31, represents a similar view showing the normal positions of the shuttles and the looper hooks at the completion of a row of knots. Figs. 32, 33 and 34 represent diagrammatically successive positions of the looper hooks, from the position shown in Fig. 31, in effecting the engagement of said hooks with the bobbin thread or twine. Fig. 35, represents diagrammatically the rotative positions of the looper hooks to form the loops. Fig. 36, represents the partial retraction of the looper hooks to draw out the loops of the bobbin threads, rotation of the hooks having been made from the position shown in Fig. 35, and one of the hooks being shown as about to engage a spool thread. Fig. 37, represents a succeeding step in the operation in which the hooks have been rotated backward slightly, from the position shown in Fig. 36, and have been further retracted, to position the spool threads this figure also disclosing, approximately, the manner in which the spool threads are engaged between the tines of the needles, said tines being in section. Fig. 38, is a cross sectional view of parts of the machine, on line 6—6 Fig. 3 showing the positions of these parts slightly prior to the positions shown in Fig. 37, showing the swinging of the needles toward the looper hooks and the upward movement of said needles to engage and carry upward the spool threads through the loops of the bobbin thread. Fig. 39, is a sectional view taken at right angles to Fig. 38 showing the needles at their highest limit of movement with the separator blades and the bobbin shuttle drawing hooks advanced between one reach of each of the spool threads and indicating, approximately, the relative positions of the threads at this time, attention being called to the extension of the spool thread from one of the prior formed knots through the loop of the bobbin thread, up along one side of the needle and between its tines and then downward beneath the looper hook and upward to the spool shuttle, so called at this time. Fig. 40, represents a cross sectional view of parts of the machine, taken on line 6—6 Fig. 3, illustrating the movement of the bobbin shuttle, through the shed formed by the spool thread, and showing, approximately, the relative position of the spool shuttles at this time. Fig. 41, is a diagrammatic view indicating the action of the positive take up on the finished net to draw the loosely formed knots toward the edge of the knot board, this figure also showing the position of the needles at the time the knots are tightened and indicating that, at about this time, the spool threads have been relieved from the tension of the rewinding reels of their respective shuttles by reason of the application of the shuttle brake mechanism. Fig. 42, is a similar view showing the knot as tightened on the tine of the needle just after the loop has been doffed from the looper hook. Fig. 43, is a similar view showing the knot tied on the longer tine of the needle. Fig. 44, is a diagrammatic view illustrating relative arrangement of some of the shuttles. Fig. 45, represents a portion of a narrow net, made on this machine and shows the extension of the threads or strands from the last finished row of knots to the looper hooks, which latter are indicated.

Similar numbers of reference designate corresponding parts throughout.

As shown in the drawings in its preferred form the machine comprises a pair of end frames 2—2 substantially of the shape shown in Fig. 5 and having suitable braces 3, 4 and 5 and such other connections as shall hereafter be described. At the rear of the frames 2—2 are bearings in which the drive shaft 6 is journaled, said shaft having the rotatable pulley 7, adapted to be driven in any well known manner, and furnished with the clutch member 8 which is adapted to be connected with the shaft 6 by the complemental clutch member 9 slidably mounted on said shaft 6 and designed to be moved into and out of engagement with the clutch member 8 by the slide rod 10, Fig. 1, connected with the arms 11 of a bell crank which is mounted to swing in a bearing depending from the brace 4, near one of the frames 2, and has the upwardly extending arm 12 connected by the rod 13 with the similar arm 14 pivotally supported from the brace 4 near the other frame 2.

On the shaft 6 are mounted pinions as 15 (Fig. 5) from which motion is imparted to the large gears 16—16 on the main or cam shaft 17 which is journaled in bearings in the frames 2—2. The gears 16—16 are furnished at their sides with cam paths as $a$, Fig. 5, and on said shaft 17 near the frames 2—2 are respectively mounted the cam members 20, 21, 22—23 and 24—25, while, near the center of its length, said shaft is furnished with the cam members 26 and 27 free on said shaft 17 and having gears 29 and 30 fixed to their sleeves, while gear 31 is fixed on said shaft. The specific cams of said cam members will hereinafter be more specifically described with relation to the particular mechanisms actuated respectively by said cams. Mounted on the brace 3 between cam members 26 and 27 is the bearing bracket 32 in a bearing of which is journaled the shaft 33 carrying gears 34 and 35 which mesh respectively with gears 29 and 31 and gear 36 which meshes with gear 30, whereby motion is transmitted from shaft 17 through gears 31, 35 and 34 to gear 29 of cam member 26 and through said gears 30, 35 and 36 to gear 30 of cam member 27, to drive said members 26 and 27 one rotation while shaft 17 makes two rotations.

Journaled in bearings in the frames 2—2 is the take up roll 40 having at one end the ratchet 41 which is engaged by the pivoted pawls carried by the arm 42 (see Fig. 26) of the positive take up mechanism which is pivotally mounted to swing about the axis of shaft 40 and is actuated at times by the cam 20′ of cam member 20 through the medium of the pivoted levers 42′—42″ and the bearing 42³ on said lever 42″. Pivotally mounted adjacent said ratchet is the arm 43 having the pivoted pawls 44—44, adapted to engage said ratchet at times, and the quadrant 45 the teeth of which are in engagement with the rack 46 of arm 47, slidable in the guide 48, carried by the pivot of arm 43, and pivotally connected with the block 49 slidable in the guide 50, see Figs. 5 and 9, and engaged by the adjusting screw 51. This guide 50 is mounted to swing on a stud extending from the adjacent end frame 2 and has the arm 52 which is pivotally connected with the cam arm 53 forked at its inner end to slide over the guide 54, free on shaft 17, and having the bearing 55 engaged with the cam path $c$, of the cam member 20, which cam path is shaped to so actuate the arm 53 that the take up roll 40 is intermittently actuated through the rack 46 and pawl arm 43. The roll 40 is furnished with the gear 56 which meshes with gear 57 of roll 58 which is journaled in bearings of the frames 2—2.

Extending between the frames 2—2 is the beam 59 having the upper edge member 60 on which are mounted lateral guides as 61, Fig. 6, carrying the knot board 62 above the member 60. On the guides as 61 is slidable a carriage 63 furnished with the arms 64—64 and the plates 66 and 67 slidably supported by the yokes 68—68 on which, between said plates 66—67 is carried the bar 69 having a series of vertical perforations 70—70 through which the pins 71—71 of the bar 72 are depressed against the pressure of springs 73, 73 by fingers 74—74 mounted on the rock shaft 75 which is journaled in bearings of the stiffening truss 76 which is attached to the plate 67 and is of any desired construction designed to stiffen the plates 66—67 and their attached parts to assist in carrying the weight of the shuttles supported at times by said plates. From the shaft 75 depend the members 77 which are actuated at times to rock the shaft 75, by the pushers 78 of the curved arms 79 pivotally mounted on the studs 80 extending from the frames 2—2 and pivotally connected with cam actuated rods 81 which are slidable in guides 82 of said frame 2—2, adjacent cam members 22—23, whereby the bearings 83 of said rod 81 register with and, at times, are actuated by peripheral cams $d$—$d$ of said cam members 22—23, see Figs. 1 and 6.

Extending from shaft 75 are arms as 84 fixed on said shaft to the inner ends of which are connected levers as 85 which are secured on shaft 86 rotatable in bearings of said frames 2—2 and having at one end the shifting lever 87 furnished with the spring latch 88, of usual construction, whereby when said shifting lever 87 is operated the shaft 86 is rocked to swing levers 85 and effect the sliding outward of carriage 63 from the position shown in Fig. 6, for inspection of the netting beneath said carriage. At its upper portion plate 67 is furnished with a series of brackets 89—89, and on these brackets is the longitudinally extending guard rail 90, while below said rail in bearings of said brackets, is journaled the shaft 91 having latches 92—92 which lock over shoulders at the inner ends of guides 64 when carriage 63 is at its inward position. On the plate 66 is secured the plate 95 having slots 96—96, which extend in line with the perforations 70—70, the material of said plate between said slots being shaped to form fingers 97—97 having rounded ends 98—98. Secured to said plates 67 and 95 are the frames 99—99 which extend between the perforations 70—70 and form stalls for one series of shuttles.

Slidably mounted in vertical guides of the frames 2—2 are the members 100—100 connected in pairs by the cross bars as 101, Fig. 5, and having at their upper ends the transverse guides or rails 102—102 and to said cross bars 101 are pivotally connected the cam actuated rods 103—103 forked at their lower ends (Fig. 7) to slidably engage the guide blocks as 104, free to rotate on shaft 17, and having the bearings as 105 engaged in the cam paths e—e of the respective cam members 20—21. On the guides of the members 100—100 are mounted the inclined guides 106—107 in which are slidably mounted the spring pressed rods 108 and 109 having bearings 110—111 registering with and adapted to be lifted by the peripheral cams f—f of the respective cam members 20—21. The purpose of this mechanism will hereafter be more fully described.

The shuttle carriage, designated as a whole by numeral 112, comprises the stiffening truss 113 of any usual construction and suitably cross braced to support the longitudinally extending plates 114—114 and the parts associated therewith. These plates 114 are furnished with the depending frames 115—115, suitably spaced apart to receive shuttles therebetween, and the edges of said plates 114 form stops for the shuttle hooks, and also slidably support plates 116—116 having the depending locking bars 117—117 and the upwardly extending members 118—118 to which are pivotally connected the arms 119—119 of the shaft 120 which is journaled in bearings of said truss frame and carries on its ends the double pawls 121—121 free to swing on said shaft and having the upwardly extending arms 122 furnished with the rolls 123—123 which are designed to ride under and lift the latches 124—124 pivotally mounted in the posts 125—125 of the truss frame bearings and free to move vertically in guides of posts 126—126. Fixed on shaft 120 is the lever plate 127 having the tooth 128 and the pins 129—130 designed to be alternately engaged by the arms 122—122, when said arms are swung by their pawls 121—121, to effect the rocking of shaft 120 and the shifting of plates 116—116 to engage or disengage the bars 117—117 with the hooks of a series of shuttles. This actuation of the pawls 121—121 is effected through rods 108—109 at intervals timed with relation to the position of carriage 112 as will hereafter be described.

Pivotally connected with the end portions of carriage 112 are the connecting rods 132—132 to which are pivoted the upper ends of the levers 133—133 pivotally mounted on studs of the frames 2—2 and pivotally connected with the cam arms 134—134 which have forked members, slidably engaged with guide blocks 135—135 free to rotate on shaft 17, and bearings 136—136 engaged in the cam paths $a$—$a$ of the gears 16—16, whereby upon the rotation of said gears the connections with the carriage 112 effect the back and forth movement thereof and permit the carriage to dwell at certain points in its movement as will be explained hereafter.

Extending longitudinally of the machine is the brace 137 having a series of brackets 138—138, Figs. 4 and 6, on which the flat bars 139—140 are mounted; secured to the bar 140 is the plate 141 which is on the level of plate 95 and has the series of tongues 142—142, furnished with enlarged and somewhat pointed ends 143; each of said tongues 142 being provided with a frame 144 whereby a series of shuttle stalls are formed which register with the stalls formed by the frames 99.

Extending rearwardly from the brace 137 is a series of guides 145—145 furnished at their outer ends with bearings in which is journaled the rock shaft 146 having the latches 147—147 and the arms 148—148 to which are pivotally connected the rods 149—149 which are in turn pivotally connected with the arms 150—150, mounted to swing on bearings supported by the frame brace 151, and with the cam arms 152—153 having forked ends, slidably engaging the guide blocks 154—155 free on the shaft 17, and furnished with the bearings 156—157 engaged in the cam paths as $g$ of the cam members 24 and 25, whereby at each rotation of said cam members the arms 152—153 and their connections are operated to effect the swinging upward of the latches 147—147 and the holding of the same in the elevated position for a short period of time.

Slidably mounted on the guides 145—145 is a carriage which extends the length of the machine and is herein designated, as a whole, by numeral 158. On this carriage are mounted a series of frames 159—159 having rearwardly extending guide arms 160—160, on which is slidable the bar 161, and forwardly extending arms 162—162 carrying the longitudinal plates 163 and 164. The arms 162—162 are furnished with guides in which are slidable the members 165—165 secured at their outer ends to the bar 161 and having at their inner ends the longitudinal plate 166 slidably mounted (see Fig. 28) and carrying the separator blades 167—167 which register with the spaces between the frames 144. The springs 168—168, connected with the bar 161 and plate 163, tend constantly to draw said bar and its members inward toward the stops 169—169.

At one end of plate 166 is mounted the rod 166' which is slidably engaged in a perforation of the upwardly extending arm of bell crank 166² pivotally mounted in a bracket carried by one of the end frames 2 and having the rotatable bearing disk 166³. Pivotally mounted on a stud 2⁷ extending from said frame 2 is the way or track 2⁰ the rear end of which is pivotally connected with lever 2¹, see Figs. 27 and 29, which in turn is connected with one arm of bell crank 2² pivotally mounted on a stud extending from the brace 5 and pivotally connected by the rod 2³ with the pivoted lever 2⁴, supported by said brace near one end thereof, furnished with the bearing 2⁵ adapted to be acted upon by cam 2⁶ of cam member 20 at each rotation of said cam. This operation is to effect the swinging of track or way 2⁰ at times to cause the upward movement of the bearing 166³, riding on said way, to tilt the bell crank 166² and, through the rod 166', to effect the sliding of plate 166 and its separator blades 167 against the action of spring 166⁴, secured to said plate 166 and to a fixed part of the machine.

Depending from plate 164 is a series of ears 170—170 between which are pivotally mounted the shuttle engaging hooks 171—171 having the upwardly curved rear ends 172—172 having lips located to be intercepted by plate 163 when these rear ends 172—172 of said shuttle hooks are drawn down by their springs 173—173 connected with said ends 172—172 and with a fixed part of the carriage 158.

The ends of carriage 158 are positioned and shaped, see Fig. 5, to be intercepted by frames 2—2 and said ends have pivots on which the guide blocks 174—174 are free to swing to accommodate said blocks to the swinging of the levers 165—165 pivotally mounted on studs extending from the frames 2—2 and having upper forked ends slidably engaging said blocks 174—174 while the lower ends of said levers are pivotally connected with the cam arms 176—176 having bearings 177—177 engaged in the paths as $h$ of cam members 20—21 and forked ends which are free to slide in guides of the blocks 178—178 rotatably mounted on the shaft 17 adjacent said cam members.

In the end frames 2—2 are vertical guides 180—180, see Fig. 10, in which are slidable the blocks 181—181 having journaled therein the studs 182—182 carrying the needle beam 183 furnished with the needle shanks 184—184 having the needles 185 furnished with the tines 186. On the studs 182 are journaled the ends of the lifting rods 187—187 the lower ends of which are pivotally connected with the levers 188—188 pivotally mounted on studs extending from frames 2—2 and having bearings 189—189 engaged in the paths $i$—$i$ of cam members 22 and 23. Fixed to the ends of studs 182—182 are arms 190—190 having at their lower ends laterally projecting bearings 191—191 which are free to move in said guides 180—180 and, at the lower portions said guides, are free to move laterally in the enlargement of said guide of which cam 192, forms one edge.

Slidable laterally in guides 193—193 carried by the end frames 2—2 are arms 194—194 spring retracted by the springs 175—175 connected with part of said arms and with fixed parts of the machine and having the steps 196—196 and the bearings 197—197 which latter are designed to be engaged by the peripheral cams $d$—$d$ of cam members 22—23 to move said arm 194 and the bearing 191 laterally, when said bearings are engaged in stirrups 196—196 to effect the rocking of shafts 182—182 to swing the needles 185—185 as will hereafter be described.

Fixed to the needle beam 183 is the stud 198 having at its end the slide block 199 which is free to slide in the vertical guide 200 mounted on the plate 201 slidable in guides 202 supported by brace 5 and actuated by the pivoted lever 203 pivotally connected with plate 201 and having at its lower end the bearing 204 engaged in the cam path $k$ of cam member 27 whereby the longitudinal movement of the beam 181 and its needles is effected before the beginning of each cross row of knots.

At the end portions of the machine are guides 205—205, see Figs. 6 and 12 to 15, which are mounted on rods 206—206 vertically slidable in guides formed in the bracket 207 supported between braces 5 and 151 and furnished with slides 208—208 which carry the longitudinal beam 209 having a guide for the rack 210 free to move independently of said beam, and a series of bearings for the hooks shafts 211—211 which shafts have the pinions 212—212, engaged with rack 208, and the heads 213 having fingers 214 and 215.

On the brackets 207 are pivotally mounted the bell cranks 216—216 having the pins 217—217 on which bearings of the links 218—218, pivotally connected with slides 205—205, are free to rock and slide. To the bell cranks 216—216 are pivotally connected the cam arms 219—219 having bearings 220—220, engaged with the cam paths 1—1 of cam members 24 and 25, and forked portions which are slidably engaged with the guide blocks 221—221 free on the shaft 17 adjacent said cam members 24 and 25.

Pivotally connected with the cross pieces 222—222 secured to the rods 206—206 are the cam arms 223—223 having bearings 224—224, which are engaged in cam paths $m$—$m$ of the cam members 24—25, and forked ends which slidably engage the guide blocks 225—225 journaled on shaft 17 adjacent said cam members.

The lower portion of beam 209, see Figs. 3 and 18, has a slot through which extends the rack arm 226 furnished with a pin carrying the journaled sleeve 227 having the guide 228 in which is engaged pin 229 of lever 230 pivotally mounted on a stud extending from brace 5 and having a bearing 231 engaged with the cam path $n$ of cam member 26.

Pivotally secured to beam 209 in the sleeve 232, see Fig. 3, in which is free to slide the pin 233 of lever 234 pivotally mounted on a stud extending from brace 5 and having the bearing 235 engaged in cam path $o$ of cam member 27.

The shuttles preferably used in this machine, are described and claimed in Letters Patent granted to me May 16, 1911, No. 992,452, are not specifically claimed herein. These shuttles are all of similar construction but are arranged in two series of which series $r$, at the starting of the machine, preferably contains one more shuttle than series $s$ and series $r$ has preferably an odd number of said shuttles. The construction of these shuttles is shown in Figs. 24 and 25ª in which the case 236 has the circular rear end 237 and the tapering forward end 238 furnished with the hook 239 adapted to be engaged by the hook end of one of the members 171 of the shuttle drawing mechanism. The wall 240 extends around the edge of case 236 and is furnished with the hooks 241—241 adapted to be engaged, at times, by the bars 117—117 of the shuttle carrier while, at the lower portion said wall has the thread passage 242 and the socket 243, see Fig. 30, the latter adapted to receive one of the tapering pins 71 of the bar 72, see Fig. 6. The casing 236 and the wall 240, as also the sides of hooks 241—241 are preferably so shaped as to facilitate the passage of the same through a loop of thread or twine and at the rear upper portion of the end 237 is formed the opening 244. Within the shuttle case as described are rotatably mounted the twine or thread reel 245 and the rewinder tension reel 246 the rotation of which latter is resisted by the coiled spring 247 which, when the reel 246 is rotated against the action of said spring, tends to effect the rewinding rotation of said reel. Thread wound on the reel 245 is carried through a perforation near the periphery of said reel and a few turns of the thread are wound on said reel, and the end of the thread is carried through the thread passage of the shuttle case and engaged by the net roller 50.

On the longitudinal member 112' of the shuttle carriage are mounted bearings in which is journaled shaft 250 having the stop fingers 251—251, adapted to be intercepted by plate 112', and depending arms 252—252 carrying the longitudinal bar 253 having a series of perforations as 254, Fig. 6, in which are slidable the spring pressed pins as 255 equal in number to the number of shuttles and positioned with reference thereto that said pins may, at times, enter the openings 244 of the respective shuttle casings to bear against reel 246 or against the twine or thread wound thereon to resist the rotation of said reel. At the ends of shaft 250 are mounted lever arms as 256 connected by springs 257 with fixed parts of the carriage 112, and extending downward and laterally from said shaft 250 are arms as 258 having the posts as 259 and stops as 260 and furnished with the pivoted members as 261 having stops as 262, posts as 263 connected with posts as 259 by retraction springs 264, and roller bearings as 265.

On the ways 102 are mounted cams as 266 on which the bearings 265 are adapted to ride upward when the carriage 112 is moved toward the right from the position shown in Fig. 6 and indicated by the relative position of shuttle $s$ in Fig. 29, to swing upward the members as 261 and their arms 256 in order to effect, at this time, the swinging downward of the bar 253 to bring the ends of the pins 255 into frictional engagement with the twine or thread on all the reels 246 of the particular series of shuttles $r$ or $s$ carried at that time by the carriage. When the carriage 112 again moves forward toward the position shown in Fig. 6 the bearings 265 are free to ride under the cams 266 by the swinging of members 261 on their pivots against the action of springs as 264. At times the shuttles of one series are supported on the fingers 97 with their twines extending through the slots 96 while the shuttles of the other series are sustained by the tongues 142 of plate 141 the ends of which tongues 142 are shaped to facilitate the clearance thereof by the twines of the shuttles as the latter approach or leave said tongues. It is to be understood that all the shuttles of both series, r and s have been supplied with thread or twine of which a supply is carried on the reel 245 from whence said threads extends around the rewinder reels 246, as above described, and thence through the slots in the respective shuttle cases to and around take up rolls 40—58. In order to simplify this description said threads are indicated by reference letters t and u.

At the starting of the net making operation the bobbin shuttles r—r are resting on the longitudinal plates 66 and 67 between the frames 99 and are held from forward movement by the pins 71—71. Spool shuttles s—s are located on the plate 141 between the frames 144—144 of the tongues 142—142 with the threads t—t extending downward between said tongues, the fingers 167—167 are located above this series of shuttles s—s and the carriage 113 is located approximately in the position shown in Fig. 6 of the drawings, it being understood however that said carriage 113 has not yet engaged the spool shuttles s—s as shown in Fig. 6.

When now the machine is started cam 1 of cam member 24, see Figs. 12 and 13, operates on bearing 220 of arm 219 to effect the swinging of bell crank 216 and the sliding forward of beam 209 on its guides to move the series of hooks from the position shown in full lines in Fig. 31 to that indicated in dotted lines therein. Approximately as this forward movement is completed, Fig. 32, cam path n of cam member 26 acts on bearing 231 of lever 230 to effect the swinging of said lever a short distance to move bracket 226 and rack 210 sufficiently to give all of the hook shafts, through their pinions 212, approximately a quarter rotation as progressively shown in Figs. 33 and 34 to engage all bobbin threads u—u at points between the edge of the knot board 62 and the bobbin shuttles r—r.

About the time of such engagement of threads u—u by the hooks cam path 1 of cam member 24 acts on the bearing 220 to swing lever 219 in a direction to retract beam 209 whereby the hooks 213 draw the threads u—u, engaged by said hooks, outward and the motion of rack 210 being continued, as indicated in Fig. 35, the reaches of said threads u—u extending from said hooks 213 respectively to one of the last formed knots and to the shuttles r are twisted together as indicated in said Fig. 35. During the latter portion of such operations cam path o of cam member 27 acts on bearing 235 of lever 234 to move beam 209 to the right whereby the hooks 213 are eventually moved to positions indicated in Fig. 36 near the spool threads t—t. Through the operation of cam path n of cam member 26 and the mechanism actuated thereby hooks 213 are given a further rotative movement, about one eighth of a rotation, which brings the ends of hook members 215 above the spool threads t—t while the retractive rotation of the hooks 213 of about one eighth rotation effects the engagement of the threads t—t by said hook members 215 and the carrying of said threads t—t beneath the loops of the threads u—u as indicated in Fig. 37.

While the final retractive movement of the hooks 213 and the positioning of the spool threads t—t has thus been effected cam path k of cam member 27 acts on bearing 204 of lever 203 to swing such lever whereby slide 201 is moved to adjust the position of the needle beam 183 longitudinally through the medium of guide 200 with which an extension of the needle beam is engaged. Approximately at this time cams d of cam members 22 and 23 act on bearings 197 of the cross bars 194 to effect the swinging of guides 200, and the blocks 199, slidable in said guides, to which the ends of the needle beam 183 are secured whereby the upper ends of the needles 184 are swung away from the edge of the knot board 62 as indicated in Figs. 37 and 38 and cam paths i—i of said cam members 22—23 act on bearings 189 of the pivoted levers 188 to effect the upward movement of the needle beam 183 and its needles whereby those portions of threads t—t beneath the loops of threads u—u are engaged between the needles 185 and the tines 186, approximately as shown in Fig. 37, and are carried upward through said loops of threads t—t as indicated in Figs. 37 and 38 and thereafter such mechanism continues its operation until needle shanks 184 are swung backward toward beam 59 until they reach the position shown in Fig. 40.

Approximately at this time cam paths e of cam members 20 and 21 act on bearings 105 of the arms 103 to permit the downward movement of said arms with their cross members 101, uprights 100 and guides 102, and the shuttle carriage 112 carried by said guides 102 until the carriage members 117—117, Fig. 22, are brought down close to the upper portions of the shuttles s—s near the hooks 241—241, while the ends of the tripper members 121 are over the upper ends of the rods 109. These rods 109 are now moved upward by the cams f of the cam members 20—21 acting on the bearings 111 of said rods and through such movement the rods 109 act against the related ends of tripper members 121 to swing said members and effect the unlocking of latches 124 and the rocking of shaft 120 to swing arms 119 and thus effect the sliding of bars 117 into engagement with the shuttle hooks 241 as shown in Fig. 24. Cam paths $e$ now act on bearings 105 to move said bearings and all mechanism connected therewith upward whereby shuttles $s$—$s$ are lifted to the position shown in Fig. 5. Cam paths $h$ of cam members 20 and 21 now act on the bearings of levers 176, engaged with said cam paths, see Fig. 5, to move forward carriage 158 whereby the ends of the several separator blades 167 and the shuttle drawing hooks 171 are advanced, the separator blades 167 passing between the shanks 184 of their associated needles and the reaches of threads $t$—$t$ passing upward from the hooks 213 to the needles to move said reaches of thread away from said needle shanks, while the hooks 171 move forward between said reaches of threads $t$—$t$ and the needle shanks and engage the hooks 239 of the shuttles $r$—$r$. At or about this time cam $d$ of cam 22 acts on bearing 83 of rod 81 which slides upward and effects the operation of the series of levers 79—77—74 and their connections to depress rod 72 against its springs and to thus withdraw pins 71 from the sockets in the lower walls of shuttles $r$—$r$ to permit the forward movement of said shuttles.

When, through the operation of levers 175 and 176, carriage 158 is retracted after the engagement of the shuttles $r$—$r$ by the hooks 171 said shuttles are drawn through the spaces between the shanks 184 of the needles and the reaches of thread $t$—$t$ as indicated in Fig. 40 and ultimately reach the plate 141 where they are supported by the fingers 142, between frames 144. At this time bar 161 is engaged by latches 147 to hold said bar and the arms 165, carrying the separator blade supports in the retracted position in which the forward ends of the separator blades 167 clear the hooks 239 of the particular series of shuttles. At or about the completion of the said forward movement of the series of shuttles $r$—$r$ beam 183 moves downward until the needles 185 reach the position indicated in Fig. 41 and while such movement is being effected the rewinder reels of shuttles $s$—$s$ under the action of their springs take up the slack of threads $t$—$t$.

Through the action of cam paths $a$, of cam members 16—16, on bearings 136 of levers 134, said levers and their associated levers 133 are operated to move the shuttle carriage 112 from its position above plates 139—140 to carry the shuttles $s$—$s$ to a point above plates 66—67 (Fig. 6). During such movement bearing 265 rides over cam 266 and lever 258 is swung upward to cause the rocking of shaft 250 and to bring the brake pins 254 against the peripheries of the rewinder reels 246, or the thread wound thereon, of the shuttles $s$—$s$, as is shown in Fig. 24 whereby the retractive action of the springs 247 of said reels is prevented for a time while the similar rewinder reels of the series of shuttles $r$—$r$ are free to act to exert tension on the threads and assist in drawing the knots tight without liability of upsetting the knots.

At or about the time the bearings 265 passes out of engagement with cams 266, cam 20' of cam member 20, see Fig. 26, acts on the bearing $42^s$ of lever 42'' to effect the action of the positive take up lever 42, through its pawls, on the ratchet 41 whereby the finished net, and the threads extending therefrom, in which knots are partially formed, is taken up by the rolls 40—58 and all of the knots are tied close to the edge of the knot board 62. At or about the latter part of said take up movement beam 209 is again advanced and the loops of threads $u$ are tightened around the needles 185, such forward movement of the beam 209 carrying the hooks 213 to or beyond the point indicated in Fig. 42 whereby the loops held by such hooks are doffed onto the needles 185 as indicated in Fig. 43. Beam 183 now moves downward to its normal position whereby all the needles 185 are drawn out of their knots $v$—$v$ while cam path $c$ of cam member 20 acts on bearing 55 of lever 53 to swing crank lever 50—52 and actuate quadrant 45 by means of rack member 47 whereby arm 43 of said quadrant 45 is swung through an arc determined by the adjustment of pivot member 49 along the screw 51 and the ratchet 41 is rotated by the pawls carried by arm 43 a distance from the point to which said ratchet 41 had previously been rotated by the pawls of arm 42 and the rolls 40 and 58 take up the finished net and the threads extending therefrom to the shuttles to determine the length of the mesh.

Approximately at the time that the shuttles $s$—$s$ are brought to positions above plates 66—67 cam paths $e$ of cam members 20—21 act on the bearing as 105 to again allow arms 103 and the mechanism supported thereby to move downward whereby the spool shuttles are brought to position on said plates 66—67 and become bobbin shuttles so called in the tieing of the next row of knots. As said shuttles reach the plates 66—67 their sockets 243 are engaged by pins 71 to hold said shuttles against longitudinal movement while the shuttles are released from the rods 117 of the shuttle carriage 112 by the action of the rods 108 lifted by cams $f$ of cam members 20—21 and acting against the associated ends of the respective tripper levers 121 the operation of which has been described above. After such release of the shuttles cams e of cam members 20—21 act to move upward bearings as 105 and the parts actuated by such movement to raise slides 102 and cam paths a of cam members 16—17 act on bearings as 136 to effect the retraction of shuttle carriage 112, through the mechanism connected therewith, to the position shown in Fig. 5. After each series of shuttles has been lifted, by the shuttle carriage 112, from between the frames 144 the latches 147 are actuated, through the mechanism above described, to release bar 161 whereby springs 168 are free to act to draw said bar 169 and its attached parts back to the position indicated in Fig. 6.

Attention is now directed to Figs. 44 and 45 of the drawing. In Fig. 44 the series of shuttles r and s are arranged as for the tieing of the row of knots w—w in Fig. 45, if the net be viewed as in such figure or the row of knots w'—w' if the net be made in the reverse of said figure. It being noticed that, in Fig. 45, border cord x' is tied into one of the row of knots in row w—w while in row w'—w' the border cord x'' is tied into a knot. In said Fig. 44 it will be seen that series r contains seven shuttles while series s contains six shuttles. Bearing in mind the operation above described, that the loops of thread u, from shuttles r, are carried to the right, to be tied to threads t of shuttles s, it will be understood that all of the loops of thread from shuttles r will be associated with threads t of shuttles s except that loop formed from the thread carried by shuttle r'' for in series s, hence the number of knots tied will be equal to the number of shuttles in series s which, as shown is the six knots w. When the row of knots w—w has been completed the transposition of the series of shuttles r—r and s—s brings six shuttles in position to supply bobbin threads, to form loops, while there are seven spool thread shuttles. Loops being now formed from the bobbin threads t will be carried to the right, as before, to be tied to the spool threads u of the shuttles r but, as there is no shuttle s located diagonally to the left of shuttle r' no loop will be carried to the thread of said shuttle and hence the border cord of said shuttle will not be tied into a knot of the row w' while the border cord x'' will be passed through the loop formed in the thread of the shuttle s''. It will thus be apparent that the border cords are tied alternately to the alternate rows of knots.

The transposition of the bobbin threads and the spool threads, with their shuttles also results in forming series of knots in which the corresponding portions of all the knots of all rows extend in the same general direction and are on the same side of the net, as shown in Fig. 45 whereby a net is produced in which all knots tend to draw tighter under pull in one general direction.

Having thus described my invention I claim as new and desire to secure by Letters Patent.

1. A net making machine comprising two series of thread carriers knot tying means, and organized means for moving both of said series of carriers in succession forward past the knot tying position and rearward above said position.

2. A net making machine comprising a pair of shuttle supports spaced apart, two series of shuttles, adapted at times to be supported by said supports, means for moving forward one of said series of shuttles from one of said supports to the other of said supports, and means for moving the other of said series of shuttles out of the paths of the advancing shuttles.

3. A net making machine comprising a pair of shuttle supports spaced apart, a series of shuttles, means for moving said shuttles horizontally from one to the other of said supports, and means for moving said shuttles vertically with respect to both of said supports.

4. A net making machine comprising a pair of shuttle supports spaced apart, a series of shuttles, means for moving said shuttles from one to the other of said supports, and means movably mounted with respect to said shuttle supports for moving said shuttles vertically from one of said supports and toward the other of said supports.

5. A net machine comprising a pair of shuttle supports spaced apart, a series of shuttles, means for moving said shuttles forward from one to the other of said supports, and means for moving said shuttles in the reverse direction through a different path of movement.

6. A net making machine comprising a shuttle support, a series of shuttle engaging pins movably mounted with respect to said support, and intermittently operable means for moving said pins out of the engaging position.

7. A net making machine comprising a pair of shuttle supports spaced apart, guides having supports mounted for vertical movement, means for moving said supports, a shuttle carriage slidable on said guides, and shuttle engaging means on said carriers.

8. A net making machine comprising a pair of shuttle supports spaced apart, guides having supports mounted for vertical movement, means for moving said supports, a shuttle carriage slidable on said guides, releasable shuttle engaging means on said carriage, means for sliding the carriage, and means for actuating said shuttle engaging means.

9. A net making machine comprising a pair of shuttle supports spaced apart, a shuttle carriage mounted for movement above said shuttle supports and having releasable shuttle engaging means, means for moving such carriage, and means acting on said shuttle engaging means when the carriage is above one of said supports, to engage shuttles on said support, and means for releasing said engaging means when said carriage is above the other of said supports.

10. A net making machine comprising a pair of shuttle supports spaced apart, a shuttle carrying mechanism mounted to move transversely of said supports and having releasable shuttle engaging means, means for moving said shuttle carrying mechanism, and intermittently operated means for alternately moving said shuttle engaging means to the engaging and disengaging positions.

11. A net making machine comprising a pair of shuttle supports spaced apart, guides, vertically slidable supports on which said guides are mounted, means for moving said supports, a shuttle carriage slidable on said guides, intermittently acting mechanism for sliding said carriage, releasable shuttle engaging means on said carriage, and mechanism for actuating said engaging means when said guides are at their lowest point of movement.

12. A net making machine comprising a pair of shuttle supports spaced apart, two series of shuttles, means for moving series of shuttles horizontally from one to the other of said supports, a shuttle carriage having releasable shuttle engaging means, vertically movable means on which said carriage is mounted, mechanism acting to move said vertically movable means downward after the operation of said shuttle drawing means, and means for actuating said shuttle engaging means when the shuttle carriage is at its lowest point of movement.

13. A net making machine comprising a shuttle carriage movably mounted and having shuttle engaging means, shuttle tension mechanism mounted on said carriage, and means for operating said tension device during the movement of said carriage.

14. A net making machine comprising a shuttle carriage movably mounted and having shuttle engaging means, a lever operated tension mechanism mounted on said carriage and adapted to act on a series of shuttles carried thereby, and means adapted to intercept the lever of said tension mechanism during the movement of said carriage in one direction to actuate said lever.

15. A net making machine comprising a shuttle carriage movably mounted and having shuttle engaging means, means for moving said engaging means to the shuttle holding position, a second means for actuating said shuttle engaging means to the open position, and tension mechanism mounted on said carriage and adapted to act on the shuttles carried by said carriage at a time intermediate the operation of said shuttle engaging means.

16. A net making machine comprising guides, vertically slidable supports for said guides, intermittently acting means for moving said supports, a carriage slidably mounted on said guides, means for moving said carriage, a lever operated tension device on said carriage, and means fixed with relation to the movement of said carriage and adapted to engage said lever to swing the same.

17. A net making machine comprising two independent thread sustaining devices, loop forming means adapted to act on thread of one of said thread sustaining devices, means for forming a bend in the thread of the other of said thread sustaining devices and passing said bend through the loop of the first thread, means for passing the first mentioned thread sustaining device through said bend of the second thread, and means for moving said second thread sustaining device to the original position of the first of said devices.

18. A net making machine comprising means for forming a series of loops in one series of threads, means for passing through said loops bends of a second series of threads, means for passing the threads of the first series through said bends, and means for repeating such operation in reverse order in the next row of knots.

19. A net making machine comprising means for forming loops in one series of threads, means for passing through said loops bends of a second series of threads, means for passing through said bends the threads of the first series, means for drawing tight the knots thus loosely formed, and means for positioning the threads of the second series to enable them to be acted upon by said loop forming means.

20. A net making machine comprising means for forming loops in one series of threads, means for passing through said loops bends of a second series of threads, means for passing the threads of the first series through the bends of the second series, and means for subsequently positioning the threads of the second series to enable them to be acted upon by said loop forming means.

21. A net making machine comprising a single series of loop forming devices, two series of thread carriers, a series of means for forming bends in threads and moving the same relatively to the loop forming devices, and means for positioning said series of threads in alternating succession to be engaged by said bend forming means.

22. A net making machine comprising two series of thread carriers, a series of loop forming devices, means for operating said loop forming devices to draw loops from the threads of one series of said carriers, said loop forming devices having means for engaging threads of the other of said series of carriers to position the same with respect to said loops, and means for moving the threads so positioned through said loops.

23. A net making machine comprising two series of thread carriers movably mounted, means for drawing loops from the threads of one of said series of carriers while said series is at rest, means for passing threads from the second series of carriers through said loops and into the path of the first series of carriers, and means movable between the arms of said threads extending through said loops for drawing the first series of thread carriers therethrough.

24. A net making machine comprising a pair of shuttle supports, two series of shuttles, looper means consisting of a series of hooks rotatably mounted in a support mounted to move toward and from one of said shuttle supports, said hooks having means for engaging two threads, and means for moving said hook support, means for rotating said hooks to engage one series of threads and form loops therein and for subsequently engaging the second series of threads to position them relatively of said loops means for forming loops in said second series of threads and passing said loops through the first formed loops and means for passing threads through the last formed loops, substantially as described.

25. A net making machine comprising a pair of shuttle supports, two series of shuttles, looper means consisting of a series of hooks rotatably mounted in a support mounted to move toward and from one of said shuttle supports, said hooks having means for engaging two threads, means for moving said hook support, means for rotating said hooks to engage one series of threads and form loops therein and for subsequently engaging the second series of threads to position them relatively of said loops and means for passing the second series of threads through the loops of the first series.

26. A net making machine comprising a pair of shuttle supports, two series of shuttles, looper means consisting of a series of hooks rotatably mounted in a support mounted to move toward and from one of said shuttle supports, said hooks having means for engaging two threads, means for moving said hook support, means for rotating said hooks to engage one series of threads and form loops therein and for subsequently engaging the second series of threads to position them relatively of said loops and means for passing the second series of threads through the loops of the first series said thread passing means having points on which the loops may be subsequently drawn tight.

27. A net making machine comprising a pair of shuttle supports, two series of shuttles, looper means consisting of a series of hooks rotatably mounted in a support mounted to move toward and from one of said shuttle supports, said hooks having means for engaging two threads, means for moving said hook support, means for rotating said hooks to engage one series of threads and form loops therein and for subsequently engaging the second series of threads to position them relatively to said loops, means for passing the second series of threads through the loops of the first series, said thread passing means having points on which the loops may be subsequently drawn tight, means for drawing the shuttles of the loop series through the bends of thread extending through said loops, and means for partially retracting said thread passing means to bring their needles within the loops.

28. A net making machine comprising a pair of shuttle supports, two series of shuttles, looper means consisting of a series of hooks rotatably mounted in a support mounted to move toward and from one of said shuttle supports, said hooks having means for engaging two threads, means for moving said hook support, means for rotating said hooks to engage one series of threads and form loops therein and for subsequently engaging the second series of threads to position them relatively to said loops, means for passing the second series of threads through the loops of the first series said thread passing means having points on which the loops may be subsequently drawn tight, means for drawing the shuttles of the loop series through the bends of thread extending through said loops, and means for partially retracting said thread passing means to bring their points within the loops said second series of shuttles having thread rewinding means to take up the slack thread during the retraction of the thread passing means.

29. A net making machine comprising two shuttle supports spaced apart, a series of shuttles, a series of thread engaging devices movable vertically with respect to said supports, looper mechanism mounted to move toward and from one of said supports and parallel thereto, means for moving said looper mechanism, and means effecting a continuous upward movement of said thread engaging devices and a step by step retractive movement thereof.

30. A net making machine comprising a shuttle support, a series of shuttles, a series of thread engaging devices movable with respect to said support and having points on which loops of thread may be drawn close, a series of looper hooks mounted for movement transversely of said needles and adapted to pass by said needles to cast off the loops from said hooks and means for moving said looper hooks.

31. A net making machine comprising a knot board, means for sustaining a series of shuttles above the knot board, a series of shuttles, a needle beam movably mounted with respect to said knot board and having a series of needles, looper mechanism including a series of hooks adapted to move between said needles, means for moving said needle beam, and means for moving the looper mechanism to bring the hooks thereof above the edge of the knot board.

32. A net making machine comprising a knot board, a series of shuttles, means for sustaining said series of shuttles above said board with their threads extending over the edges of the board, looper mechanism comprising a beam mounted to move vertically, horizontally and longitudinally and a series of hooks carried by said beam, and means for moving said beam vertically, to bring the hooks above the knot board, horizontally to advance said hooks above the knot board to engage threads, and to retract said hooks to draw out said threads, and longitudinally to carry said threads laterally.

33. A net making machine comprising a knot board, means for sustaining a series of shuttles thereabove with their threads extending over the edge of said board, a needle beam movably mounted with respect to said knot board and having a series of needles movable into the paths of said shuttles and having shanks located between the paths of said shuttles whereby said shuttles may pass by said needle shanks, means for moving said needle beam, and means for moving said shuttles.

34. A net making machine comprising a shuttle support, a series of shuttles, a needle beam movable with respect to said support and having a series of needle shanks extending, in the elevated position, between the paths of said shuttles, means for moving said needle beam, separators mounted for movement between the shanks of said needles, means for moving said separators, and means for moving forward said shuttles.

35. A net making machine comprising a shuttle support, a series of shuttles thereon, a needle beam movable with respect to said support and having a series of needles the shanks of which, in the elevated position, extend between the paths of said shuttles, means for moving said needle beam, separators mounted for movement between said needle shanks, shuttle drawing means also mounted for movement between said needle shanks, and means for moving said separators and said shuttle drawing means simultaneously during the initial part of their retraction.

36. A net making machine comprising two shuttle supports spaced apart, a knot board located below one of said shuttle supports, and movable looper mechanism normally located, at rest, below the other of said supports, and means for moving said looper mechanism toward and above said knot board.

37. A net making machine comprising two shuttle supports spaced apart, a series of shuttles, a knot board located below one of said supports, a series of needles mounted to move past said knot board and between said shuttle supports, movable looper mechanism located, at rest, below the other of said supports, means for moving said looper mechanism toward and above said knot board, and means for moving shuttles from one to the other of said shuttle supports.

38. A net making machine comprising two shuttle supports spaced apart a series of shuttles, and having frames forming stalls for receiving the shuttles, shuttle moving means working through the stalls of one of said supports, and means for lifting the shuttles from one series of said stalls.

39. A net making machine comprising two series of thread shuttles, means for sustaining said series in registration, looper mechanism, movably mounted, for engaging threads of one of said series of shuttles and forming loops therein, means for moving said looper mechanism to engage threads of those shuttles of a second series which are located diagonally of the shuttles from which the loop threads extend, means for passing the thus engaged threads of the second series through the loops of the first series to form bends, and means for passing shuttles of the first series through said bends.

40. A net making machine comprising two series of shuttles differing in number, means for so sustaining said series that the shuttles of the lesser series register with an equal number of shuttles of the greater series, knot forming mechanism for interlooping complemental threads of shuttles diagonally positioned, and means for passing the shuttles of one of said series through the several bends of said interlooped threads.

41. A net making machine comprising two series of shuttles differing in number, means for so sustaining said series that the shuttles of the lesser series register with an equal number of shuttles of the other series, means for drawing out all the threads of the lesser series and forming loops therein, means for passing through said loops threads, respectively of the shuttles of the greater series next diagonally adjacent the loop shuttles, to form bends, and means for passing the respective loop shuttles through such bends as are in registration therewith.

42. A net making machine comprising two series of shuttles, loop drawing means, means for alternately carrying said series successively to the loop drawing position, and means adapted to act on the threads of said series, when so positioned, to form loops therein and to move both of said series of loops laterally in the same direction.

43. A net making machine comprising two series of shuttles, loop drawing means, means for alternately carrying said series successively to the loop drawing position, means adapted to act on the threads of said series, when so positioned, to form loops therein and to move both series of said loops in succession laterally in the same direction, and a series of needles movably mounted and adapted to enter said loops when so moved.

DAVID HENRY SAUNDERS.

Witnesses:
WM. E. KERR,
L. BELLE TASS.

Correction in Letters Patent No. 1,110,718.

It is hereby certified that the residence of the assignee in Letters Patent No. 1,110,718, granted September 15, 1914, upon the application of David Henry Saunders, of Gloucester, Massachusetts, for an improvement in "Net-Machines," was erroneously given as "Bridgeport, England," whereas said residence should have been given as *Bridport, England;* and that the said Letters Patent should be read with this correction therein that the same may conform to the record of the case in the Patent Office.

Signed and sealed this 6th day of October, A. D., 1914.

[SEAL.]

R. F. WHITEHEAD,
*Acting Commissioner of Patents.*